United States Patent
Sundara-Rajan

(10) Patent No.: US 9,606,680 B1
(45) Date of Patent: Mar. 28, 2017

(54) CAPACITIVE COMMUNICATION BETWEEN STYLUS DEVICES AND COMPUTING DEVICES

(71) Applicant: Amazon Technologies, Inc., Reno, NV (US)

(72) Inventor: Kishore Sundara-Rajan, San Jose, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 188 days.

(21) Appl. No.: 14/303,072

(22) Filed: Jun. 12, 2014

(51) Int. Cl.
  *G06F 3/044* (2006.01)
  *G06F 3/0354* (2013.01)

(52) U.S. Cl.
  CPC .......... *G06F 3/044* (2013.01); *G06F 3/03545* (2013.01)

(58) Field of Classification Search
  CPC ................ G06F 3/03545; G06F 3/041–3/047
  USPC ...................... 178/18.01–19.07; 345/173–183
  See application file for complete search history.

(56) References Cited

U.S. PATENT DOCUMENTS

| | | | |
|---|---|---|---|
| 7,612,767 B1 * | 11/2009 | Griffin | G06F 3/044 178/19.03 |
| 8,217,917 B2 | 7/2012 | Hill | |
| 8,581,886 B2 | 11/2013 | Pant | |
| 8,629,358 B2 | 1/2014 | Rimon | |
| 8,638,320 B2 | 1/2014 | Harley | |
| 2012/0068964 A1 * | 3/2012 | Wright | G06F 3/03545 345/174 |
| 2012/0127110 A1 | 5/2012 | Amm | |
| 2012/0327041 A1 | 12/2012 | Harley | |
| 2012/0327042 A1 * | 12/2012 | Harley | G06F 3/044 345/179 |
| 2013/0106722 A1 | 5/2013 | Shahparnia | |
| 2013/0106760 A1 | 5/2013 | Pedersen | |
| 2013/0106767 A1 | 5/2013 | Shahparnia | |
| 2013/0106798 A1 | 5/2013 | Sundara-Rajan | |
| 2013/0176273 A1 | 7/2013 | Li | |
| 2013/0207925 A1 | 8/2013 | Ryshtun | |
| 2014/0028576 A1 | 1/2014 | Shahparnia | |
| 2014/0028577 A1 | 1/2014 | Krah | |
| 2014/0028607 A1 | 1/2014 | Tan | |
| 2014/0062966 A1 | 3/2014 | Szymanski | |

(Continued)

FOREIGN PATENT DOCUMENTS

| | | |
|---|---|---|
| EP | 2172834 A2 | 7/2010 |
| WO | 2013165466 A1 | 11/2013 |

OTHER PUBLICATIONS

Purcher, Apple Continues to Advance the iPen in 3 New Detailed Filings, Patently Apple.com, Jan. 30, 2014.

(Continued)

*Primary Examiner* — Michael Pervan
(74) *Attorney, Agent, or Firm* — Seyfarth Shaw LLP; Ilan N. Barzilay; Joseph M. Walker

(57) ABSTRACT

A stylus device is disclosed that enables a computing device to communicate to the stylus device using a capacitive link. In an aspect, the stylus device detects a change in an electric field generated by the computing device. A message including data is received from the computing device via the change in the electric field. The message may include an identifier corresponding to a data encoding scheme to be used for sending data to the computing device. Based on the identifier, the stylus device may configure itself to operate using the data encoding scheme.

21 Claims, 20 Drawing Sheets

(56) References Cited

U.S. PATENT DOCUMENTS

| | | |
|---|---|---|
| 2014/0160088 A1 | 6/2014 | Mercea |
| 2014/0240298 A1* | 8/2014 | Stern .................... G06F 3/0383 |
| | | 345/179 |
| 2014/0267184 A1 | 9/2014 | Bathiche |
| 2015/0177868 A1* | 6/2015 | Morein .................. G06F 3/044 |
| | | 345/174 |

OTHER PUBLICATIONS

International Search Report of PCT/US2015/035242, Mailed Sep. 1, 2015, Applicant: Amazon Technologies, Inc., 11 pages.
International Preliminary Report on Patentability, Mailed Dec. 22, 2016, Applicant: Amazon Technologies, Inc. et al, 8 pages.

* cited by examiner

CAPACITIVE COMMUNICATION BETWEEN STYLUS DEVICES AND COMPUTING DEVICES

BACKGROUND

With the advancement of technology, the use and popularity of electronic devices, such as mobile devices, has increased considerably. Mobile devices, such as smart phones and tablet computers, typically have touch screens that enable a user to operate the devices by touching the screen with a finger or stylus type device. Stylus devices can mimic the use of familiar writing tools, such as pens and pencils.

BRIEF DESCRIPTION OF DRAWINGS

For a more complete understanding of the present disclosure, reference is now made to the following description taken in conjunction with the accompanying drawings.

DETAILED DESCRIPTION

Figure 1:
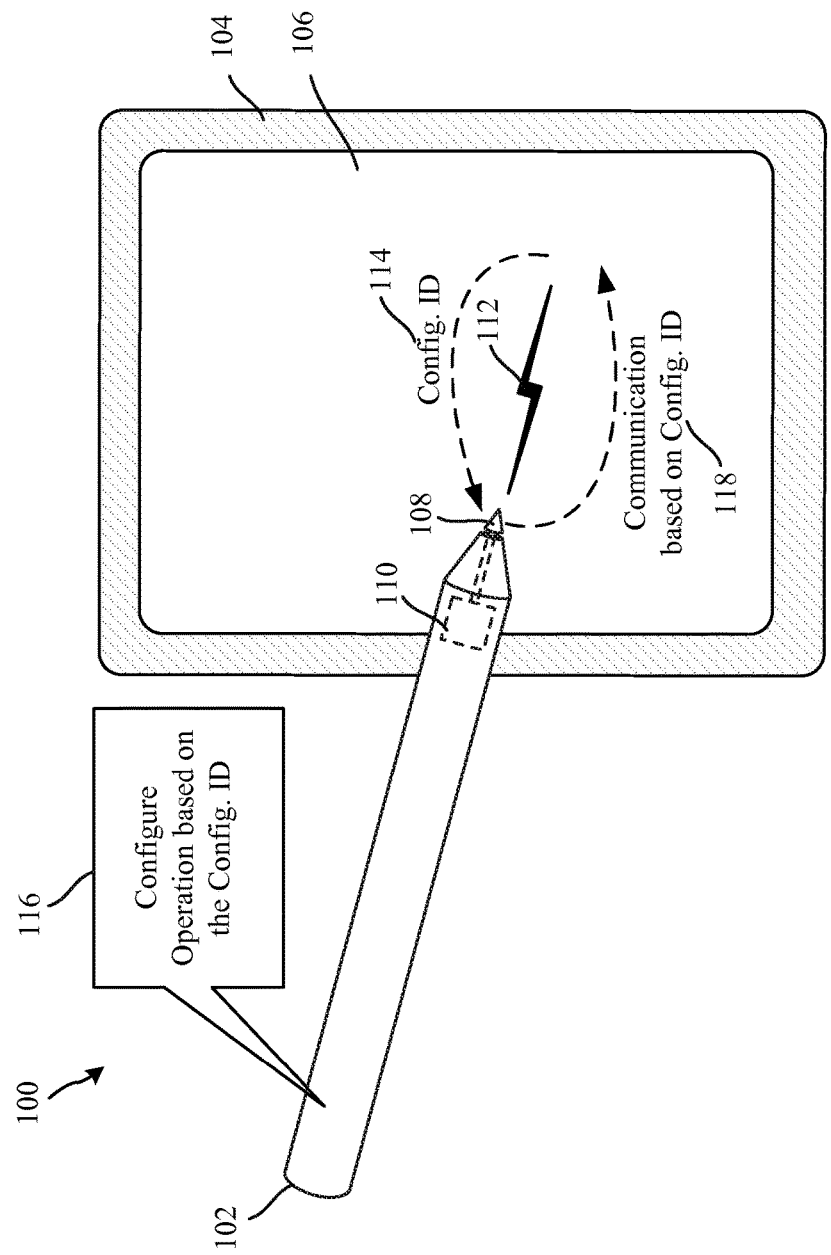
FIG. 1 illustrates an overview of a system for implementing embodiments of the present disclosure.

One drawback to operating a computing device with a stylus is the general one-way communication of such operations where a stylus (through user control, a radio transmitter, or the like) communicates with the computing device but the computing device typically does not have the ability to communicate with the stylus. If two-way communication were enabled, it would allow the implementation of many more features and customization of stylus-device operations. Two-way radio control, however, can be expensive in terms of stylus cost and design. In an embodiment, offered is an active capacitive stylus that enables the computing device to communicate to the active stylus, for example, via a touch controller, using an electromagnetic communication channel, such as a capacitive link or capacitive communication channel. This enables bi-directional data transfer between the stylus and the computing device without requiring a separate radio communication link to enable device-to-stylus communications. In this embodiment, the stylus may have a receiving electrode embedded in a ferrule portion of the stylus capable of detecting changes in the electric field around it. The touch controller of the computing device can modulate this electric field by driving electrodes or antennae of the touch screen. This allows a high signal to noise ratio on this capacitive channel and enables communication over the capacitive channel.

Another drawback to operating a stylus with a computing device is that a number of styli operate at a fixed frequency or group of fixed frequencies often as a result of a stylus being configured to work with a particular device, where the device specifies a fixed operating frequency or group of frequencies. Therefore, the communication between a stylus and the computing device may degrade when there is external noise in the same spectra as that of the stylus' operating frequency. In an embodiment, offered is an active stylus adapted to change its operating frequency to a second frequency or group of frequencies to accommodate for a changing noise environment. The second operating frequency of the stylus may be determined by the touch controller of the computing device and communicated to the stylus device in message including data using the capacitive communication channel discussed herein or through other media (e.g., Bluetooth, WiFi, infrared (IR), haptic, etc.).

Another drawback to operating a stylus with a computing device is the type of touch controller the stylus is capable of communicating with. Most styli are tied to a certain type of touch controller. This may cause a user to purchase a new stylus for each different computing device the user purchases, and it causes manufacturers to produce new styli every time the touch controller changes. If the stylus and computing device could communicate to identify to the stylus which touch controller is used in the computing device, it would allow the stylus to alter its output to function with the touch controller. In an embodiment, offered is an active stylus that is capable of configuring its operation so that it can communicate and function with a multitude of touch controllers. In this embodiment, the computing device may also be adapted to transmit a message including data, such as a configuration ID or other identifier corresponding to a requested mode of operation to the stylus device.

Yet another drawback to operating a stylus with a computing device is the power consumption of the stylus. An active stylus is said to be in writing mode (also called 'inking' or in 'touch down' mode) when there is a non-zero pressure measured on its tip thus indicating contact between the stylus tip and the computing device. Prior techniques determined that a stylus was in touch down by periodically polling a pressure sensor of the stylus and reading the pressure sensor's output using components such as an analog-to-digital converter (ADC). The ADC conversion of the analog sensor output is a power intensive process. Prior styli therefore faced a tradeoff between having a low latency of detecting touch down by increasing the pressure sensor sampling rate and conserving power by reducing the sample rate. In an embodiment, offered is an active stylus that offers a low power and low latency methodology of detecting touch down. The stylus uses an ultra-low power analog comparator to monitor the pressure sensor output to detect when the pressure crosses a preset threshold. When the analog comparator detects this threshold cross, an event is triggered that enables a more precise measurement of the force using an ADC thus saving power while also enabling sensitive pressure detection.

The embodiments described herein provide an active capacitive stylus that enables the computing device to communicate to the active stylus using the existing capacitive link; is adapted to change its operating frequency to accommodate for changing noise environment; is capable of changing its output so that it can communicate and function with a multitude of touch controllers; and provides a low power and low latency methodology of detecting touch down. The described stylus is also capable of other operations as described below.

FIG. 1 illustrates an overview of a system 100 for implementing embodiments of the disclosure. The system includes a stylus device 102 and a computing device 104 having a touch screen 106. In an embodiment, the stylus device 102 is an active capacitive type stylus including an active tip 108 and a pressure sensor 110. The active tip 108, or other portion of the stylus device 102, may generate a first signal (such as an electric field generated by the stylus device at an operating frequency) that may interact with a second signal (such as an electric field of the computing device) generated by the computing device 104 to allow the computing device 104 to determine a position of the stylus device 102. For example, electrodes of the touchscreen 106 (that may be driven by a touch controller) of the computing device 104 may be activated to generate the second signal, and the active tip 108 receives, and may amplify the second signal. The stylus device 102 may then transmit the amplified signal (or first signal) that was detected by the stylus device 102 back to the computing device 104 to allow the computing device 104 to determine the position of the stylus device 102 relative to the touchscreen (such as the X-Y coordinate position of the tip 108 on the touchscreen 106).

The active tip 108 may also have a capacitance associated with it, and a capacitive link may be established between the stylus device 102 and the computing device 104, illustrated as 112. The capacitive link may be a communication channel through which the stylus device 102 and the computing device 104 communicate using the electric fields generated by each of the stylus device 102 and the computing device 104. The capacitive link may be established in response to the stylus device 102 detecting a change in the electric field generated by the computing device 104 and recognizing the change as a communication. The capacitive link 112 may be used by the stylus device 102 to measure interactions with the computing device 104 (by detecting a change in the electric field associated with contact between the stylus device 102 and computing device 104). The capacitive link 112 may also allow the computing device 104 to communicate information, such as operating frequency and/or touch controller type to the stylus device 102. Using the capacitive link 112, the computing device 104 may communicate information to the stylus device 102 by transmitting information or data using a carrier frequency. The carrier frequency may be in a range of about 200-500 kilohertz (kHz), and more particularly in the 400 kHz range. The information transmitted along the capacitive link may be used to configure operations between the stylus device 102 and computing device 104.

For example, the computing device 104 may transmit a configuration ID, illustrated as 114, to the stylus device 102 via the carrier frequency. The configuration ID may correspond to a type of touch controller of the computing device 104 and/or may include other information. In this example, the configuration ID may correspond to an encoding scheme the stylus device should operate in when communicating with the computing device 104. The stylus device 102 configures its operation according to the encoding scheme corresponding to the configuration ID, illustrated as 116. The stylus device 102 then communicates with the computing device 104 using the encoding scheme, illustrated as 118.

Figure 2:
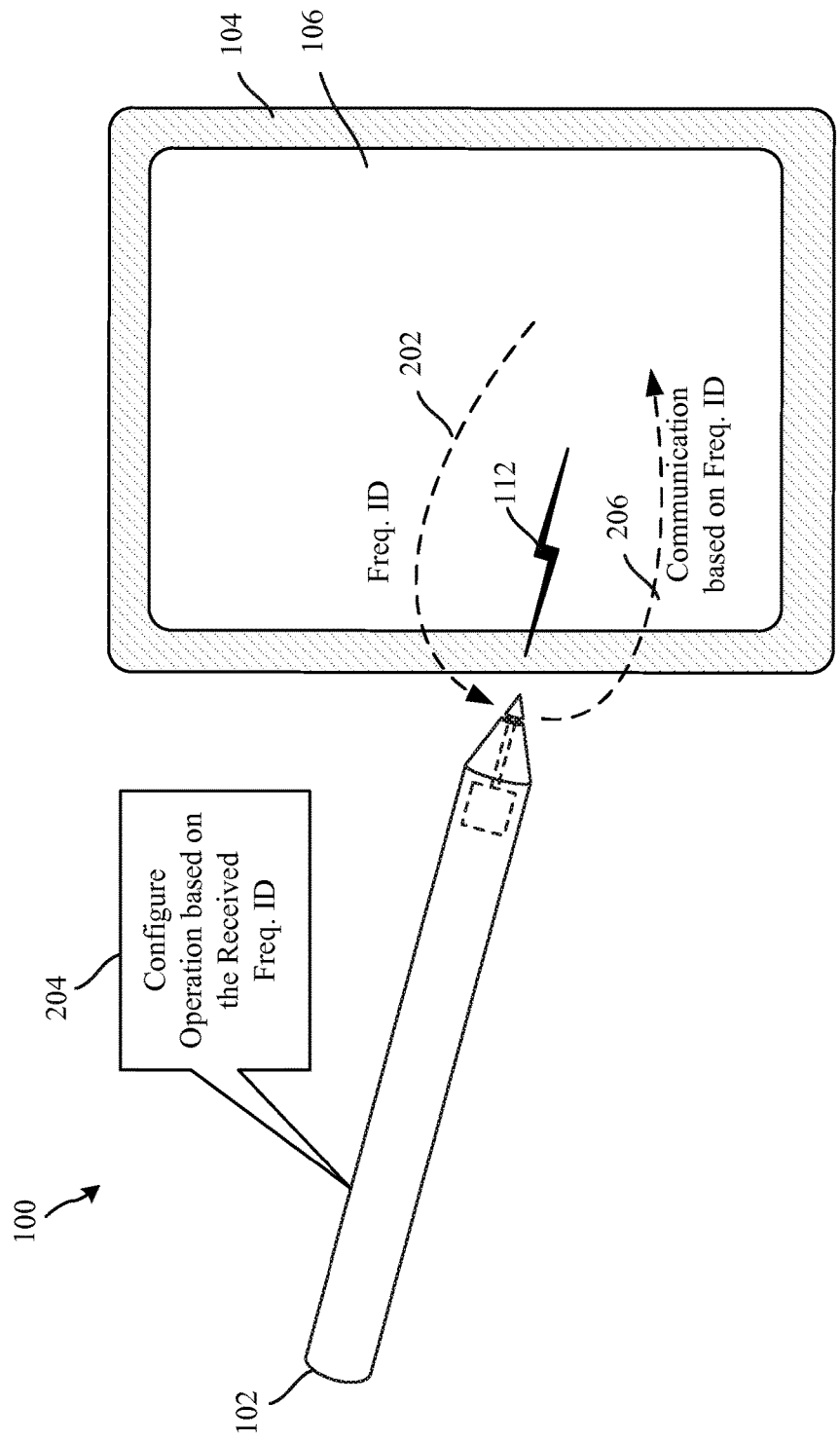
FIG. 2 is a diagram conceptually illustrating example communications between a computing device and a stylus device according to embodiments of the present disclosure.

In another example, referring to FIG. 2, the device 104 may transmit a frequency ID, illustrated as 202, to the stylus device 102 via the carrier frequency. In this example, the frequency ID may correspond to a frequency the computing device 104 desires to operate on. The stylus device 102 configures its operation according to the frequency corresponding to the frequency ID, illustrated as 204. The stylus device 102 then communicates with the computing device 104 using the frequency, illustrated as 206. The frequency ID, or other content, may be communicated between the computing device and the stylus device using a Bluetooth message, a WiFi message, an infrared message, electromagnetic (e.g., capacitive, inductive, resonance, radio frequency backscatter, etc.) message, or a haptic message.

Figure 3:
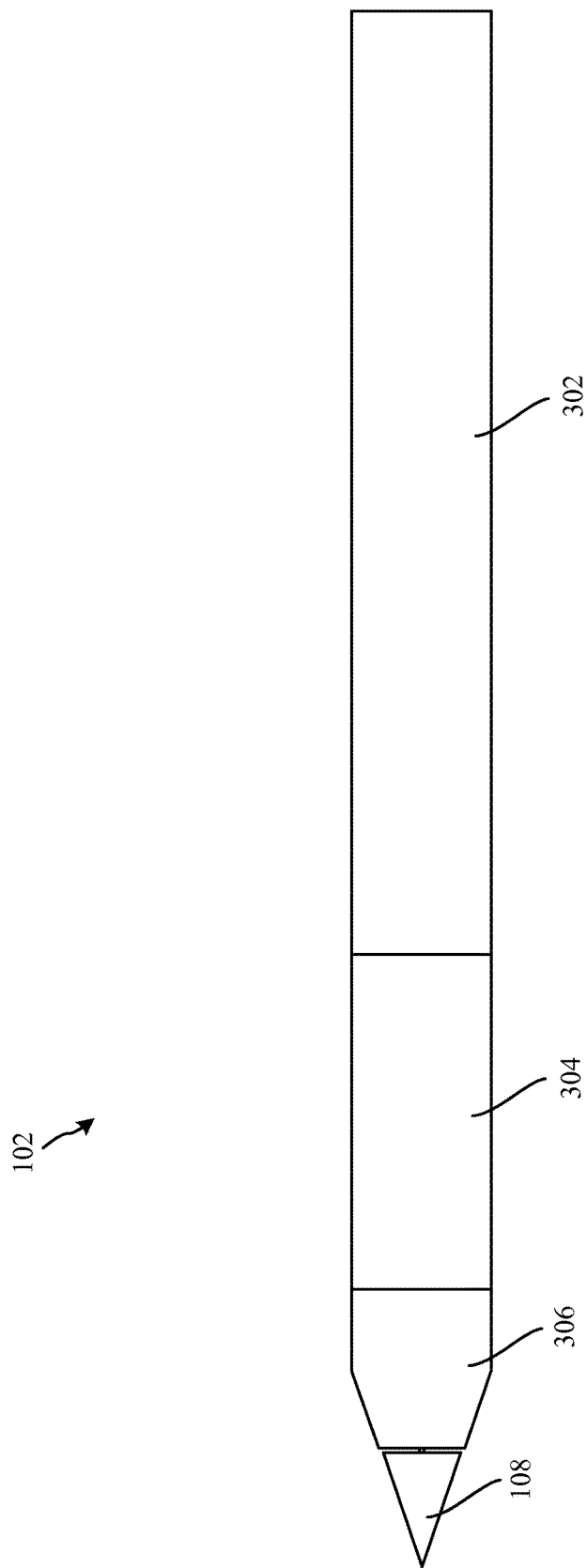
FIG. 3 illustrates an exemplary stylus device according to embodiments of the present disclosure.
Figure 4:
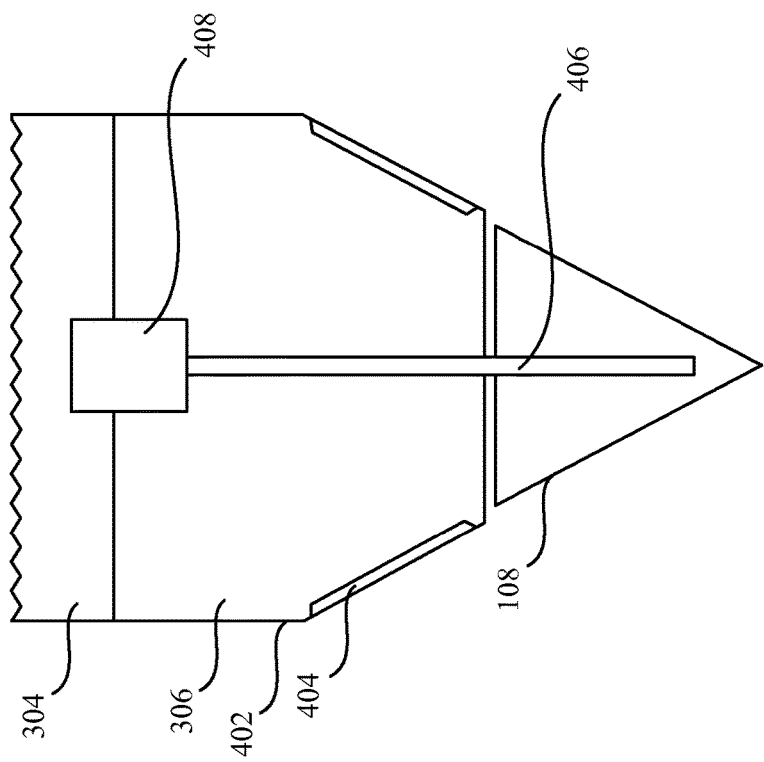
FIG. 4 illustrates a tip portion of the exemplary stylus device according to embodiments of the present disclosure.
Figure 5:
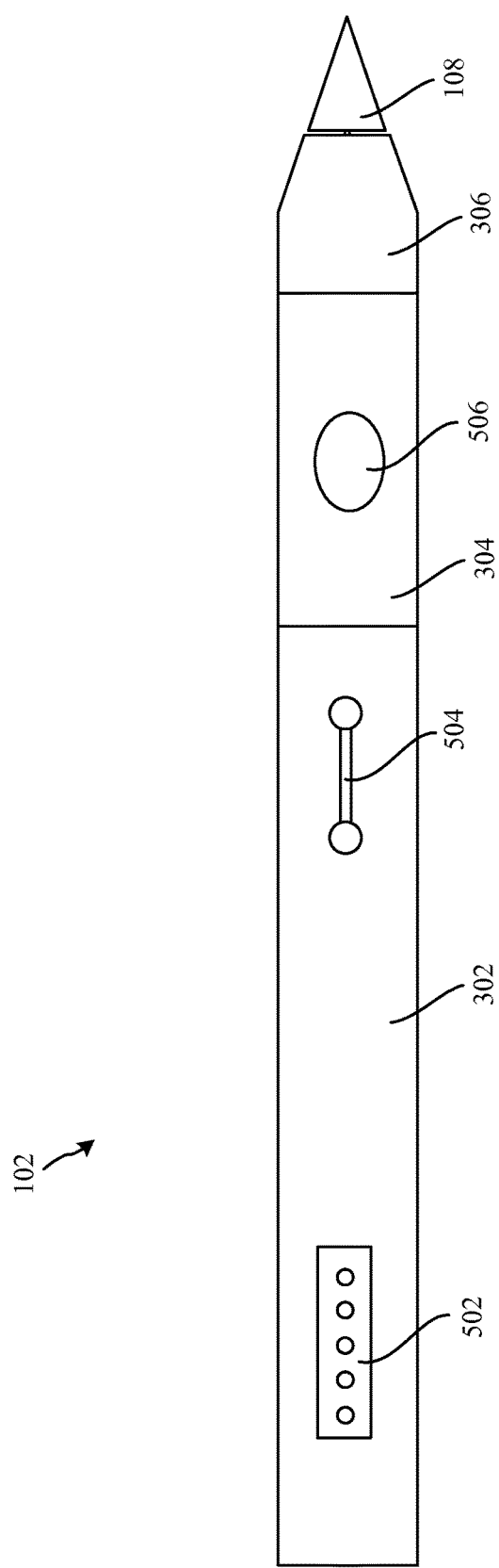
FIG. 5 illustrates the exemplary stylus device according to embodiments of the present disclosure.

FIGS. 3-5 illustrate an exemplary stylus device of the present disclosure. As illustrated in FIG. 3, the stylus device 102 includes a body or shaft portion 302, a barrel portion 304, a ferrule portion 306, and a tip portion or active tip 108.

The shaft portion 302 and the barrel portion 304 may be a single monolithic piece and function as an electrode(s) to transmit and receive information over the capacitive communication channel. The portions may therefore be made of conductive material and may have an insulative coating. One or more of these portions may be connected to electrical contacts on a microcontroller/processor of the stylus device 102 using a "pogo" pin or a similar contact based connector.

Referring to FIGS. 3 and 4, the ferrule portion 306 includes an insulative exterior 402 and one or more conductive interior electrodes 404. The electrode(s) 404 may be patterned on an interior surface of the ferrule portion 306 or may be an independent part coupled to the ferrule portion 306. In an embodiment, the electrode(s) 404 include a coil/spring on an interior of the ferrule portion 306, an antenna etched onto the interior of the ferrule portion 306 (such as an antenna created using Laser Direct Structuring (LDS)), or other type of electrode known in the art capable of receiving/detecting an electric field). The electrode(s) 404 may detect changes in the electric field, for example, generated by the computing device. For example, as described above, the computing device 104 may communicate information to the stylus device 102 over the capacitive communication channel by transmitting information or data using a carrier frequency. The electrode(s) 404 may then receive the information over this capacitive communication at the carrier frequency.

The tip 108 may be a two component mechanical part including a conductive polymer molded over a metallic shaft 406 coupled to a force/pressure sensor 408 (for example, an optical pressure sensor, a capacitive pressure sensor, a piezoelectric sensor, a piezoelectric resistive sensor, or other sensor capable of measuring force/pressure). The conductive polymer of the tip 108 may allow the tip 108 to function as an electrode and transmit and receive information over the capacitive communication channel. The conductive polymer may have a conductivity sufficient to transmit and receive transmissions to and from the computing device 104 using the capacitive communication channel described herein. The conductive polymer may also be a material that is not too soft or too hard. If a stylus tip is too hard, it may scratch the touch screen of the computing device, whereas if the stylus tip is too soft, it may leave residue on the touch screen (similar to a pencil eraser). The conductive polymer of tip 108 may be designed to avoid these problems.

The metallic shaft 406 coupled to the pressure sensor 408 provides a mechanical path from the tip to the pressure sensor 408 to allow the pressure sensor 408 to measure the pressure at the tip 108. The metallic shaft 406 also provides a transmission path for carrying a signal (such as, an electric field or frequency of operation to be generated by the stylus device 102) from a microcontroller or printed circuit board (PCB) of the stylus device 102 to the tip 108. This signal allows the stylus device 102 to communicate with the computing device 104, and allows the computing device 104 to determine a location (X-Y coordinates) of the stylus device 104 in relation to the touch screen of the computing device 104.

Referring to FIG. 5, in an embodiment, the stylus device 102 may also include one or more connectors 502, one or more switches or buttons 504, and one or more proximity sensors 506.

The connector(s) 502 may be disposed on an exterior of the stylus device 102, for example on an exterior of the body/barrel portion 302/304. The connector(s) 502 may serve as a magnetic means to attach the stylus device 102 to the computing device 104 and other accessories. The connector(s) 502 may also provide an electrical interface between the stylus device 102 and the computing device 104 (for example, a USB connector). Connector 502 may be used to re-program the stylus device 102 and/or for charging the stylus device 102.

The button(s) 504 may be disposed on an exterior of the stylus device 102, for example on an exterior of the body/barrel portion 302/304. As illustrated, the button(s) 504 are in the form of a rocker switch. However, it should be appreciated that other types of switches may be used separately or in combination. The button(s) 504 may be used to provide and allow for the user to switch between different modes of function of the stylus device 102. For example, the button(s) 504 may allow the user to switch between an eraser mode and a write mode, as well as other modes of function.

The proximity sensor(s) 506 may be disposed on an exterior of the stylus device 102, for example on an exterior of the body/barrel portion 302/304, or interior to the stylus. The proximity sensor(s) 506 are adapted to detect when a user is holding the stylus device 102. In an embodiment, there may be three proximity sensors 506 distributed radially (about 120° apart). In another embodiment, there may be two proximity sensors 506 distributed radially (about 180° apart). The proximity sensor(s) 506 may detect that a user is gripping the stylus through a number of techniques, such as detection of conductivity of a user's fingers. The proximity sensor(s) 506 may share a same shield electrode, and the shield electrode may be connected to a ground of the microcontroller/printed circuit board (PCB) of the stylus device 102.

Figure 6:
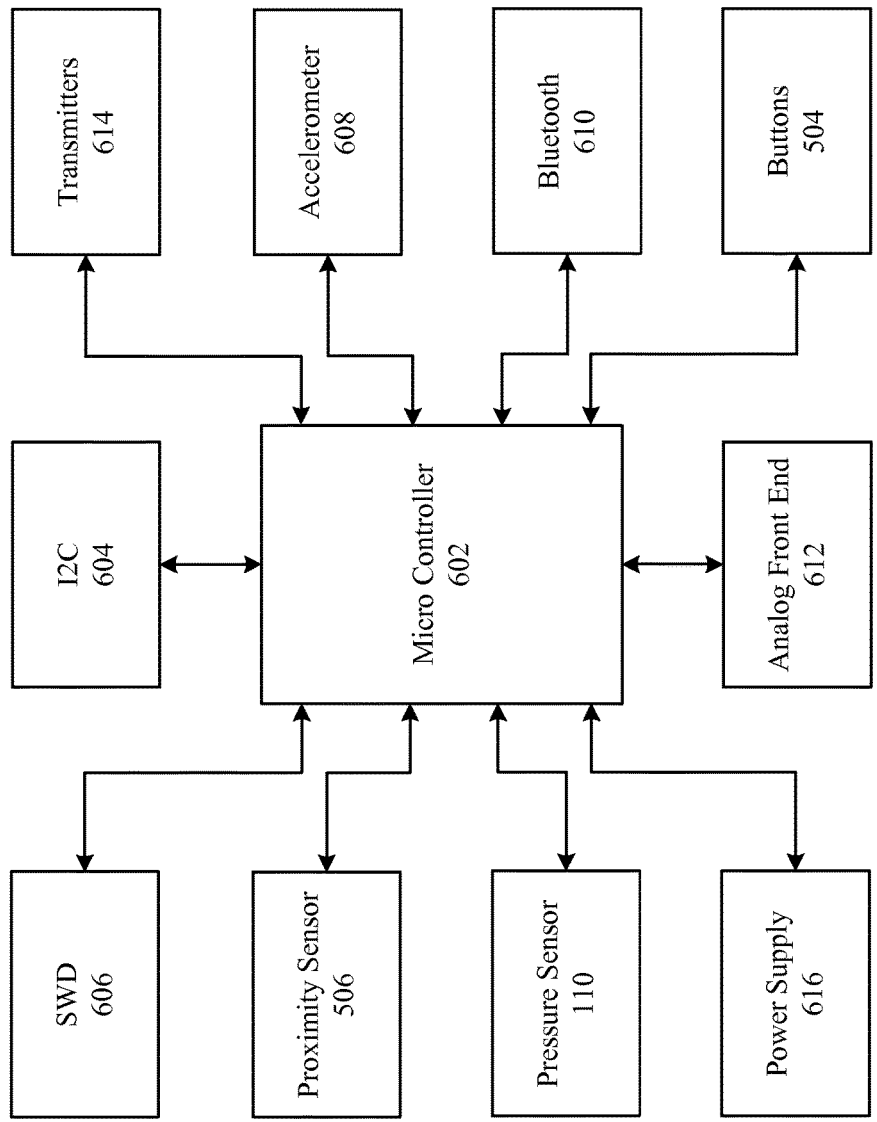
FIG. 6 illustrates a functional block diagram of components of the exemplary stylus device according to embodiments of the present disclosure.

A functional block diagram of example components of the stylus device 102 is described with reference to FIG. 6. As illustrated in FIG. 6, the stylus device 102 may include one or more of a microcontroller 602, one or more I2C (inter-integrated circuit) communication ports 604, button(s) 504, one or more serial wire debug (SWD) ports 606, accelerometer 608, Bluetooth 610, analog front end (AFE) 612, one or more transmitters 614, proximity sensor(s) 506, pressure sensor 110, and power supply module 616.

The microcontroller 602 may be any type of microcontroller. The microcontroller 602 may be capable of supporting binary phase-shift keying (BPSK) encoding and an operating frequency in the range of about 180 to about 300 kHz; amplitude-shift keying (ASK) encoding and an operating frequency in the range of about 100 to about 170 kHz; frequency-shift keying (FSK) encoding and an operating frequency in the range of about 20 to about 120 kHz, and other types of encoding schemes. The microcontroller 602 may include memory sufficient to store the encoding schemes. The microcontroller 602 may also include one or more general-purpose input/outputs (GPIOs) and other such components, and an oscillator (illustrated in FIGS. 7-8 and 11-13 as crystal oscillator 702) to reduce timing jitters on pulse-width modulation (PWM).

The I2C communication port(s) 604 may be coupled to the microcontroller 602 and the magnetic connector(s) 502. Most microcontrollers have either dedicated I2C ports or can natively configure any GPIO to be part of I2C. Software libraries may also be used to communicate I2C over standard GPIOs.

The button(s) 504 may also be coupled to the microcontroller 602. As described above, the button(s) 504 may be used for various functions, such as to allow for the user to switch between different modes of function of the stylus device. For example, the button(s) 504 may allow the user to switch between an eraser mode and a write mode, or perform other functions. GPIO pins connected to the button(s) 504 may be setup input pins with internal pull ups. When a user presses a button 504, these GPIO pins are connected to ground through switches, such as single-pole, single-throw (SPST) switches. This may toggle the input from a default state of "1" to "0". An optional capacitor may also be added in parallel to the buttons to debounce the switches if desired.

The SWD communication port(s) 606 may be coupled to the microcontroller 602 and are generally connected to ports on the stylus. These ports may be hidden. The SWD port(s) 606 may be used to program the microcontroller 602 and obtain debug data.

The accelerometer 608 may be coupled to the microcontroller 602 and adapted to determine when the stylus device is being moved, such as when a user picks-up the stylus device and/or is using the stylus device.

The Bluetooth component 610 may optionally be included and be coupled to the microcontroller 602 and adapted to transmit and receive information to and from the computing device. It should further be appreciated that additional or alternative communication component(s) may be used, such as WiFi, infrared (IR), haptic, or other component.

Figure 7:
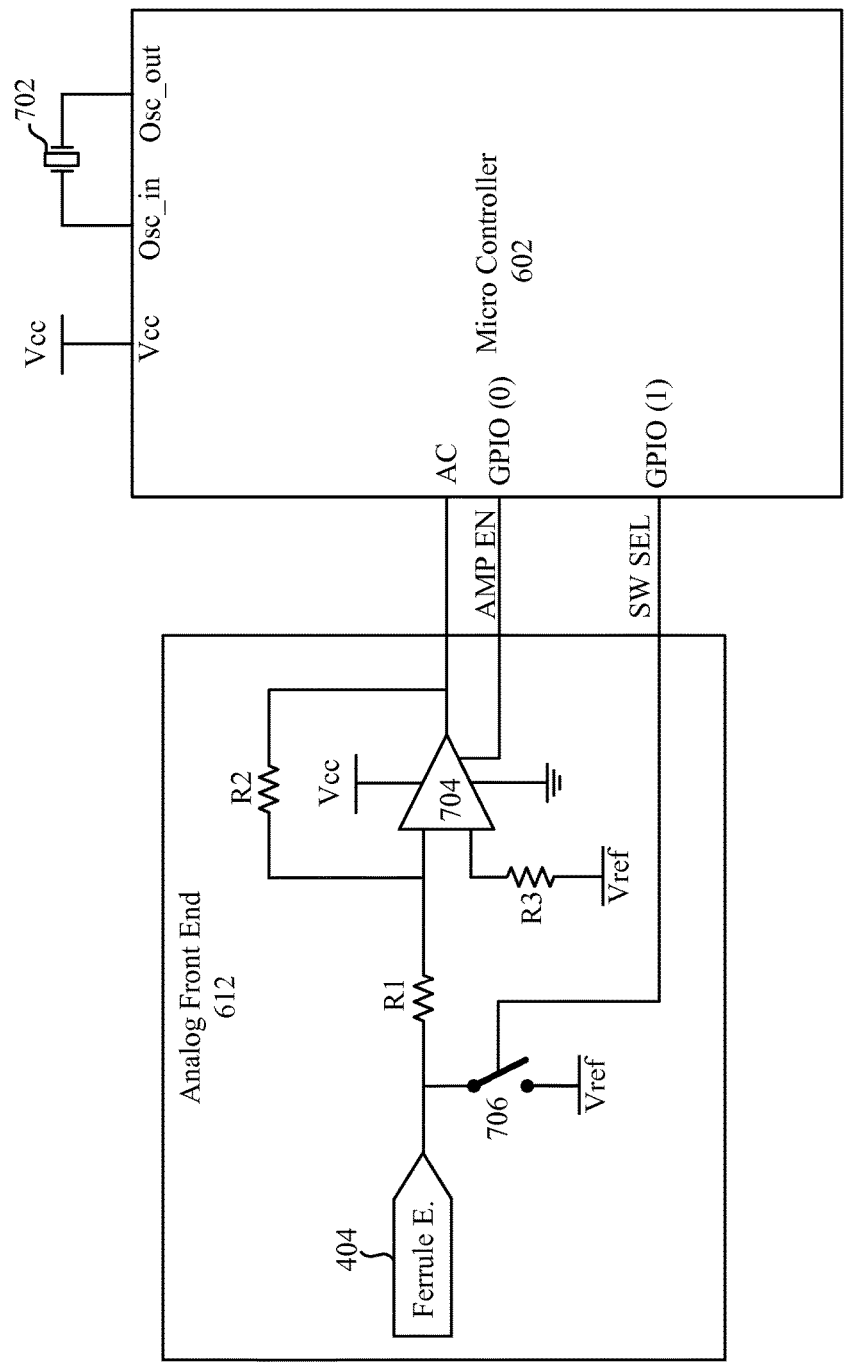
FIG. 7 illustrates an exemplary analog front end component of the exemplary stylus device according to embodiments of the present disclosure.

Referring to FIGS. 6 and 7, the AFE 612 is a communication component that may be coupled to the microcontroller 602 and may serve as a communication interface between the touch controller of the computing device and the stylus device. The AFE detects the electric field of the computing device and passes its measurements to the microcontroller 602. For example, the ferrule electrode 404 in the AFE may receive the electric field generated by the computing device 102. The AFE 612 may sense the electric field revived by the ferrule electrode 404 and passes the measurement of the electric field to the microcontroller 602. As illustrated, the ferrule electrode 404 may be coupled to the input stage of amplifier 704 and the common terminal of switch 706. The output of the amplifier 704 is coupled to a multi-threshold analog comparator pin of the microcontroller 602. In an embodiment, under normal operation, the ferrule electrode 404 (illustrated in FIG. 4) is coupled to a DC reference voltage (Vref) through the switch 706 and the amplifier stage is disabled. In an embodiment, the AFE 612 may include one or more components, such as, a low power instrumentation amplifier 704 and a low leakage SPST switch 706, one or more resisters, such as resistors R1-R3, one or more noise filtering components, such as a band pass filter and an automatic gain controller, and/or other components.

Figure 8:
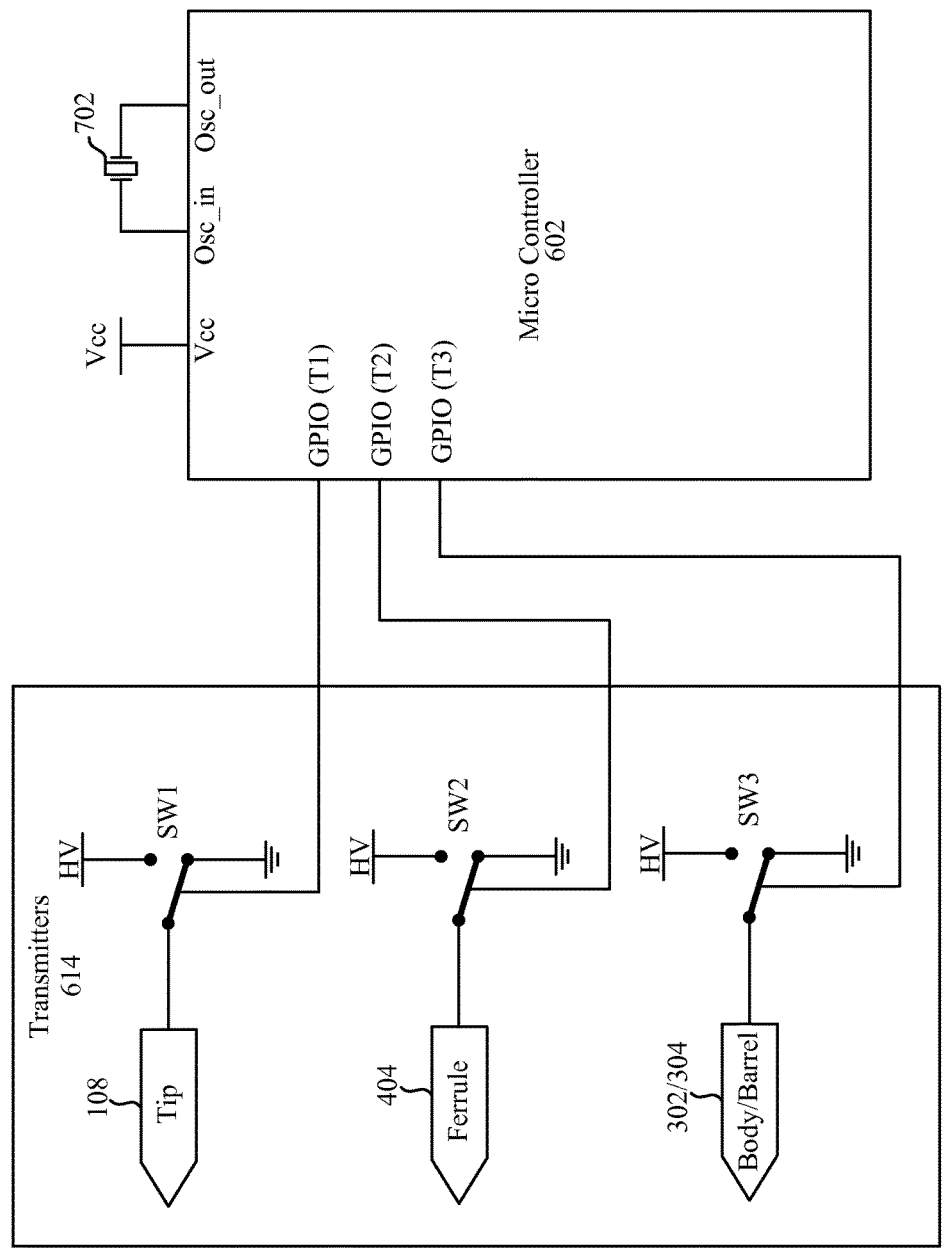
FIG. 8 illustrates an exemplary transmitter component of the exemplary stylus device according to embodiments of the present disclosure.

Referring to FIGS. 6 and 8, the stylus may provide for a combination of transmission configuration schemes by enabling independent activation of different transmitters 614 located in one or more of the tip 108 (which may function as a tip electrode), the barrel/body 304/302 (which may function as barrel/body electrode(s)), and the ferrule electrode 404. For example, the various electrodes may be activated in accordance with a certain encoding scheme. When the stylus device is configured in a BPSK encoding scheme, the tip 108, the barrel/body 304/302, and the ferrule electrode 404 may be activated to function as transmitting electrodes. When the stylus device is configured in a ASK encoding scheme, the tip 108 or both of the tip 108 and the ferrule electrode 404 may be activated to function as transmitting electrodes. Similarly, when the stylus device is configured in a FSK encoding scheme, the tip 108 may be activated to function as a transmitting electrode.

In other configurations, the various transmitters may be selectively activated or de-activated to conserve power, provide for increased signal strength, and/or to allow for increased hover distance (i.e., the distance between the stylus device and the computing device at which the stylus and computing devices are capable of communicating even though they are not in physical contact). For example, to provide for increased signal strength, all of the transmitting electrodes may be activated (i.e., the tip 108, the barrel/body 304/302, and the ferrule electrode 404). To provide for increased hover distance, only the ferrule electrode 404 may be activated for transmission. Similarly, to conserve power, only the tip 108 may be activated to function as a transmitting electrode. It should be appreciated that each electrode may be activated or deactivated independently to provide for a multitude of combinations.

To obtain an acceptable signal to noise ratio (SNR), the tip 108 and the ferrule electrode 404 may be driven in phase. Due to a user holding the body of the stylus, when the barrel/body 304/302 is activated as a transmitter, the signal/electric field generated by the barrel/body 304/302 during transmission may cancel out the signal/electric field generated by the tip 108 when the tip is also transmitting. To avoid this effect, transmissions from the tip 108 may be driven 180 degrees out of phase from transmission from the barrel/body 304/302. Driving the transmissions from barrel/body 304/302 180 degrees out of phase relative to the transmissions from to the tip 108 may cause the signal of the barrel/body 304/302 to have a cumulative effect; thereby resulting in an increased signal to noise ratio.

In an embodiment, the transmitted signals from the transmitter(s) 614 are square wave signals in the range of about 10 kHz to about 250 kHz. Their amplitudes dictate the SNR of the stylus device 102 and consequently the hover distance between the stylus device 102 and computing device 104. For example, the larger the signal strength/SNR, the larger the hover distance may be and still enable communication between the stylus 102 and computing device 104. Conversely, the lower the signal strength/SNR, the lower the hover distance may be. However, it is important to ensure that the stylus signal does not saturate the touch controller of the computing device. Therefore, the stylus device may provide a way to adjust the amplitude of its transmitted signals (i.e., the signals transmitted by the tip 108, barrel/body 304/302, and the ferrule electrode 404). Transmission amplitude(s) may be adjusted by adjusting the HV (high voltage) rail through Rfb2 (illustrated in FIG. 13). The amplitude may also be adjusted by activating or de-activating transmission from one or more of the tip 108, barrel/body 304/302, and the ferrule electrode 404. For example, the computing device 104 may communicate with the stylus device 102 to cause the stylus device 102 to increase or decrease transmission amplitude based on the strength of the signal/electric field the computing device 104 receives from the stylus device 102. If the strength of the signal is low, the computing device 104 may cause the stylus device 102 to increase the transmission amplitude; and if the strength of the signal is high, the computing device 104 may cause the stylus device 102 to decrease the amplitude (for example, to avoid saturation).

To generate the transmitted signals, a PWM waveform generated by the microcontroller 602 is used to toggle HV switches SW1, SW2 and SW3 connected to the electrodes between HV and ground. This creates a square wave whose rise and fall times are dictated by the output capacitance of the switches SW1, SW2 and SW3. As described above, the transmitter(s) 614 provide for a combination of configuration schemes by enabling independent activation of one or more of the tip 108, the barrel/body 304/302, and the ferrule electrode 404 for transmission. Activation of each of the tip 108, the ferrule electrode 404, and the barrel/body 304/302 may be controlled independently by opening and closing the respective switches SW1, SW2 and SW3 to HV.

Figure 10:
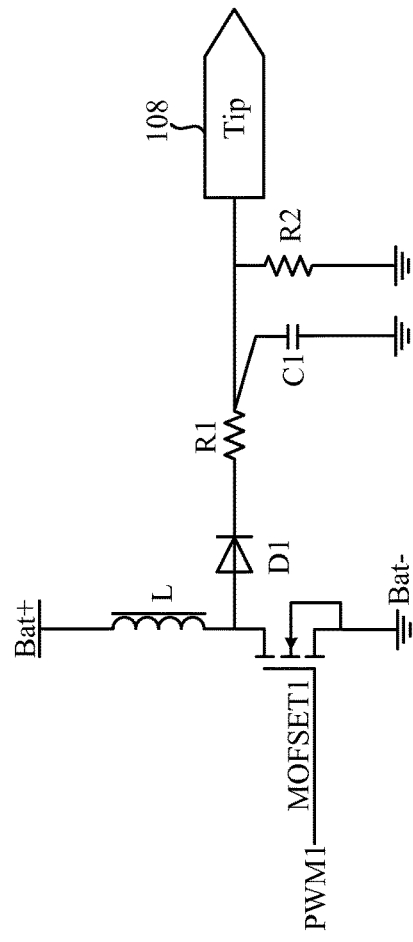
FIG. 10 illustrates another exemplary transmitter component of the exemplary stylus device according to embodiments of the present disclosure.
Figure 9:
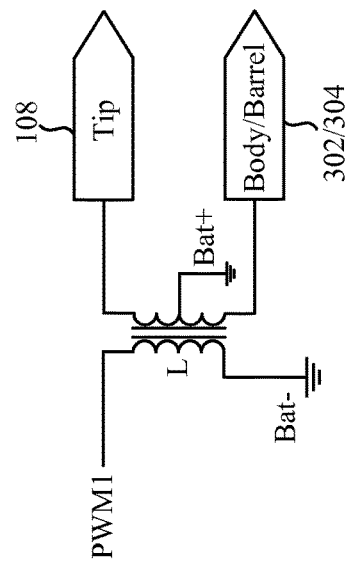
FIG. 9 illustrates another exemplary transmitter component of the exemplary stylus device according to embodiments of the present disclosure.

Alternate implementations of the circuitry for one or more of the transmitters may include using a standard differential transformer drive (as illustrated in FIG. 9) and/or a standard boost converter topology to directly generate the waveform (as illustrated in FIG. 10), as known in the art.

Figure 11:
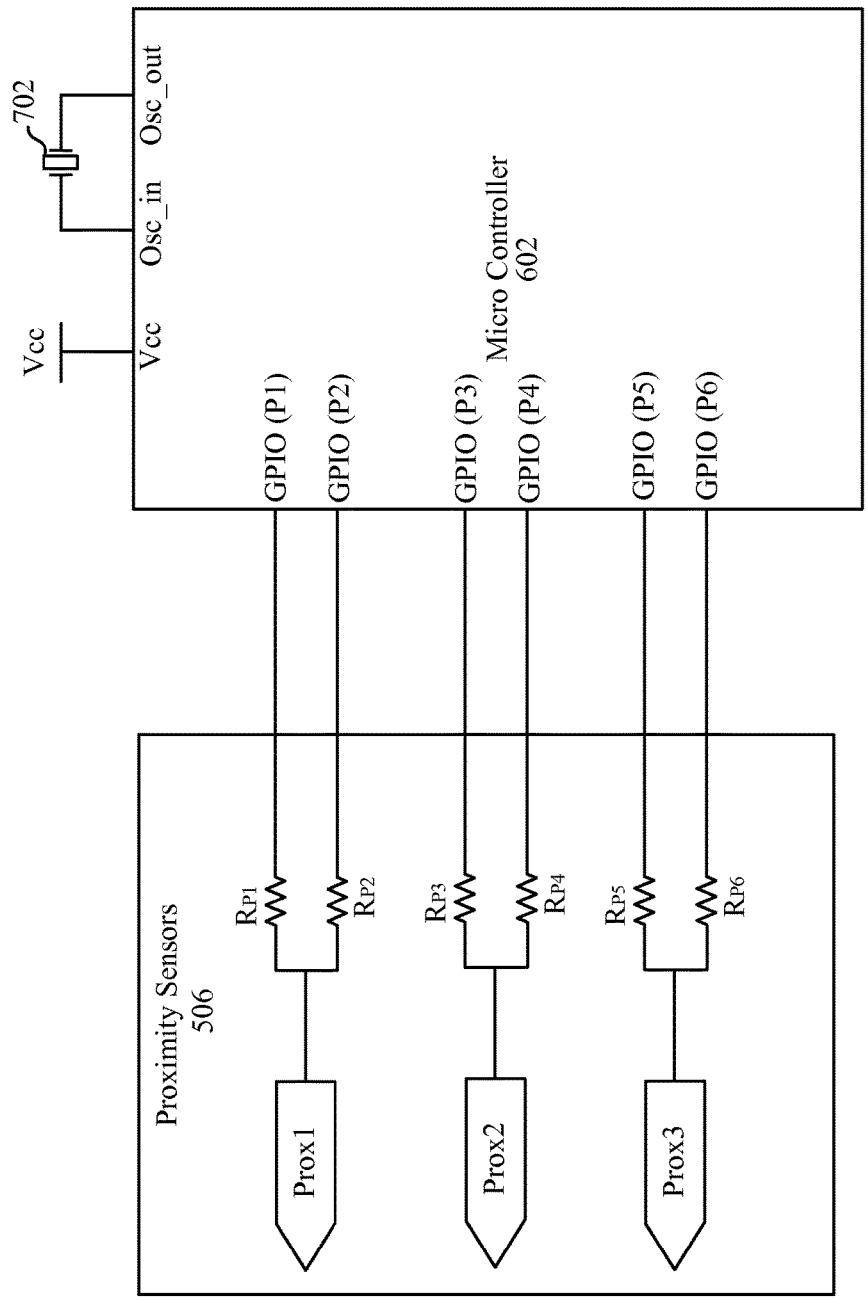
FIG. 11 illustrates an exemplary proximity sensor component of the exemplary stylus device according to embodiments of the present disclosure.

Referring to FIGS. 6 and 11, the proximity sensor(s) 506 may be used to detect when the stylus is being held by the user. The proximity sensor(s) may include single ended capacitive sensor to detect when a user is holding the stylus device. The proximity sensor(s) 506 may be implemented using two GPIO lines per sensor. For example, as illustrated in FIG. 11, a first sensor Prox1 is coupled to the microcontroller 602 via GPIOs (P1) and (P2); a second sensor Prox2 is coupled to the microcontroller 602 via GPIOs (P3) and (P4); and a third sensor Prox3 is coupled to the microcontroller 602 via GPIOs (P5) and (P6). It should be appreciated that the proximity sensor(s) 506 pads may be surrounded by a ground plane. Thus, the micro controller 602 may determine how the user is holding the stylus (i.e., which proximity sensor(s) detect the user's hand) based on which GPIO(s) include a signal.

To detect when a person is touching the proximity sensor(s) 506, a sequence of actions are taken for each of the sensors Prox1, Prox2, and Prox3. In an example, a generic GPIO may be used to implement the touch or proximity sensor(s) 506. In this example, the following actions may be taken for the first sensor Prox1: pull GPIOs (P1) and (P2) to ground, set up a timer, set the sensing GPIO (GPIO (P2) in this example) in high Z input mode, and set up an interrupt service routine (ISR) to stop the timer when the pin goes high. For example, the timer is started and GPIO (P1) is set to high. When the ISR is triggered, the time lapsed is measured. When a user (such as a user finger) is in proximity, the time lapse may increase by at least 1-2 orders of magnitude. This increase in the time lapse may be used to indicate that the user is touching the proximity sensor(s) 506. When the timer expires, the stylus 102 may determine that the user has put the stylus down and may execute certain power saving functions, depending on configuration of the stylus 102.

Figure 12A:
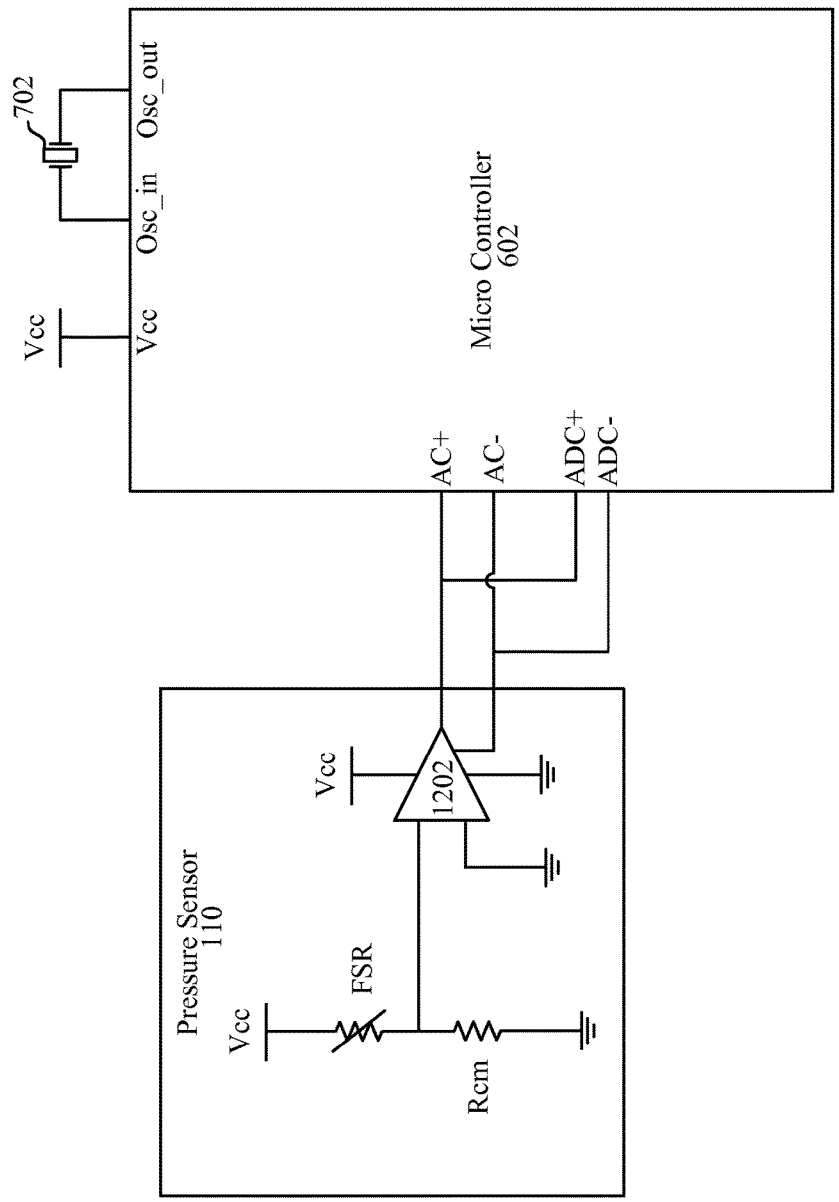
FIG. 12A illustrates an exemplary pressure sensor component of the exemplary stylus device according to embodiments of the present disclosure.

Referring to FIGS. 6 and 12A, the pressure sensor 110 may be adapted to measure at least up to 10 N of force while being linear in the 1-4 N range. In an embodiment, the pressure sensor 110 is a force sensitive resistor (FSR) based pressure sensor. The output range of the FSR based pressure sensor may be about 170 mV with sensitivity about 13 mV/N. In an embodiment, an instrumentation amplifier 1202 with a gain of about 20 may be used in differential mode to amplify the pressure sensor output before it's decoded by the ADC.

Figure 12B:
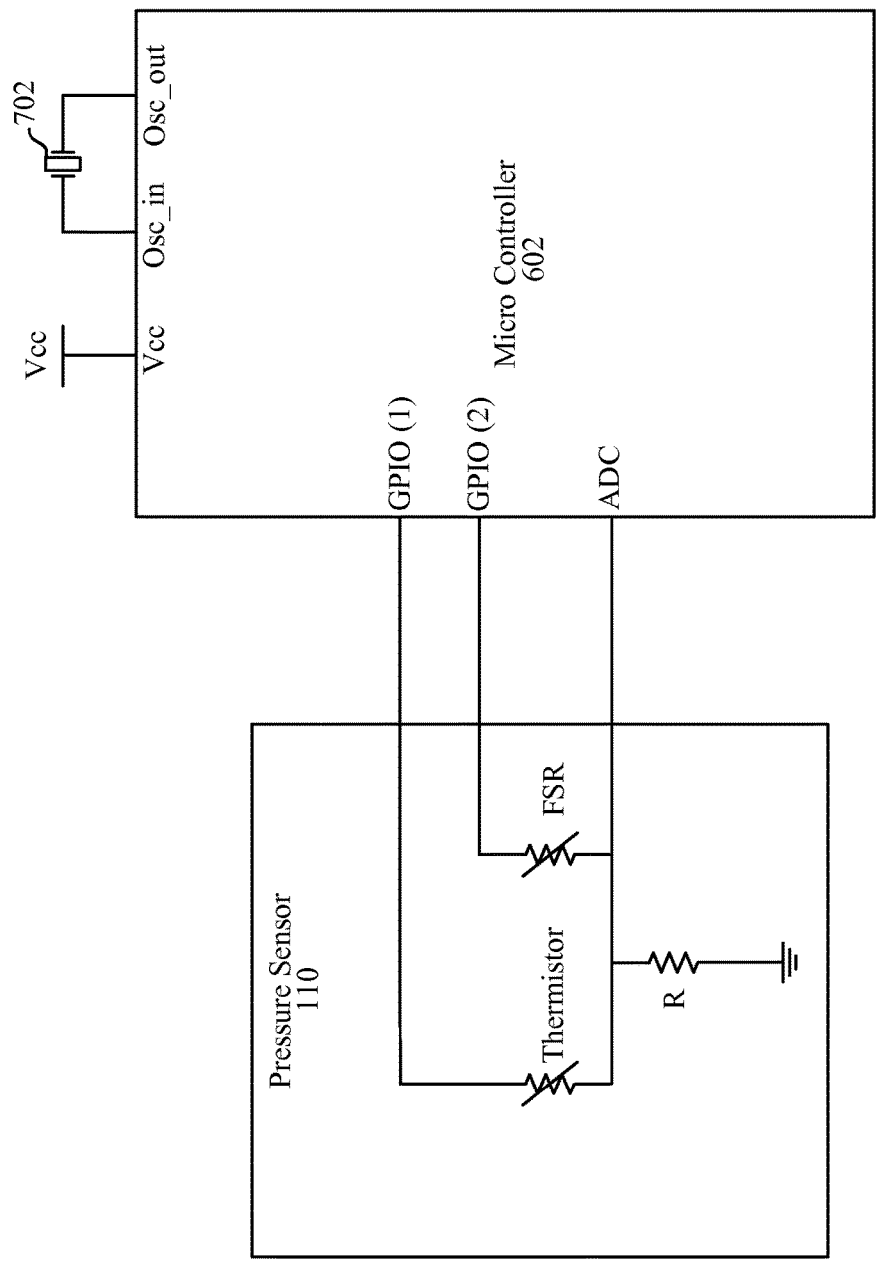
FIG. 12B illustrates another exemplary pressure sensor component of the stylus device according to embodiments of the present disclosure.

In another embodiment, referring to FIG. 12B, the pressure sensor 110 may be connected to the microcontroller 602 using two GPIOs. Pressure detected by the pressure sensor may be determined by the microcontroller by measuring voltage using an ADC pin on the microcontroller 602. In this embodiment, the GPIO pin (GPIO (2)) coupled to the FSR may be pulled high and the GPIO pin (GPIO (1)) coupled to the thermistor (THR) pulled to ground. In this configuration, the measured voltage on the ADC line is: Vadc1=Vdd*(FSR)/(FSR+(THR∥R)). The GPIO (GPIO (1)) coupled to the thermistor may then be held high along with the FSR. This results in a measured voltage on the ADC line of: Vadc2=Vdd*(FSR∥THR)/((FSR∥THR)+R). Using these two equations, and the value of the resistance of the thermistor and the FSR, the microcontroller may determine the pressure levels detected by the pressure sensor 110 using the voltage seen on the GPIOs.

Figure 13:
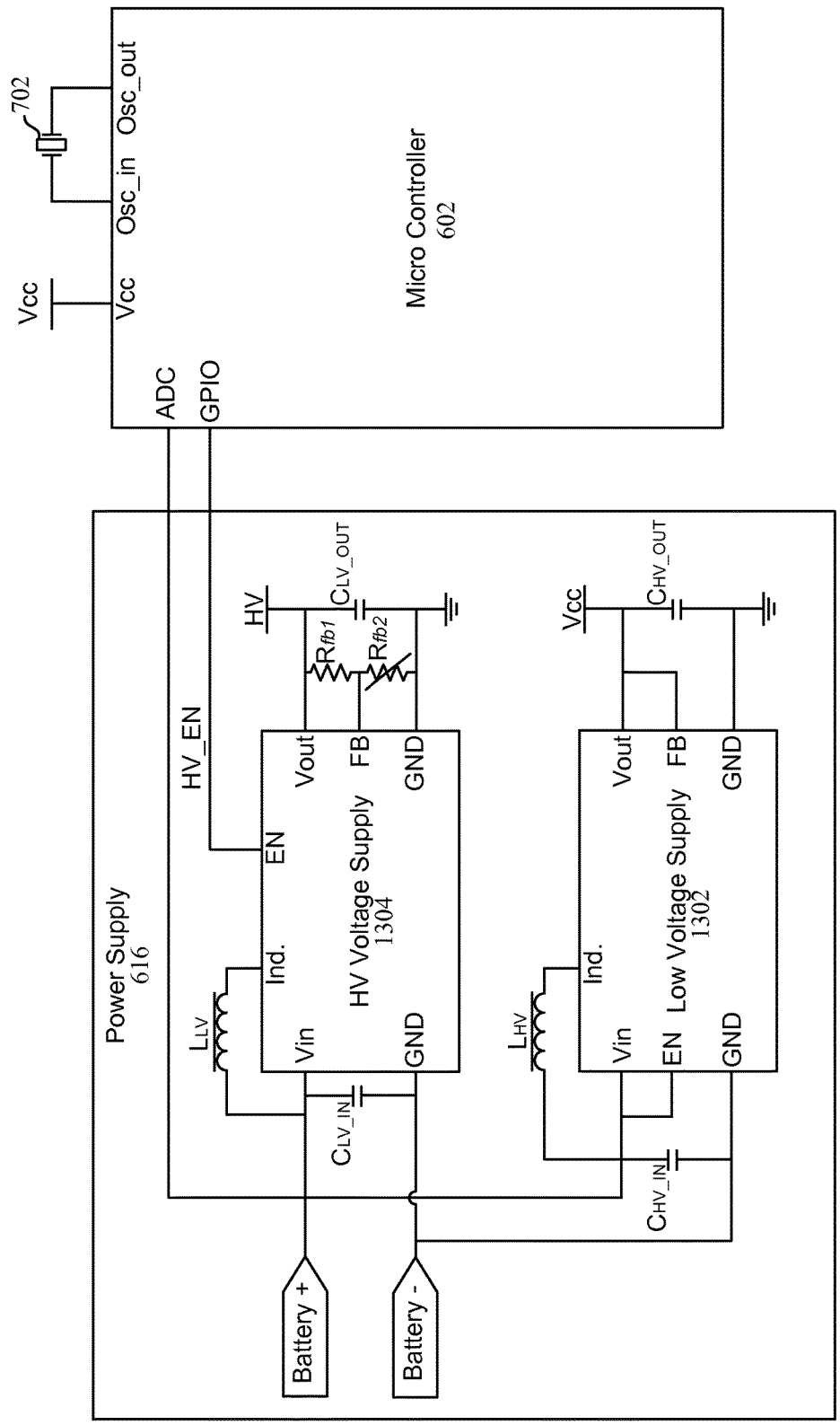
FIG. 13 illustrates an exemplary power supply component of the exemplary stylus device according to embodiments of the present disclosure.

Referring to FIGS. 6 and 13, the power supply module 616 provides two unipolar supply voltages (a low voltage supply 1302 and a high voltage supply 1304). In an embodiment, the low voltage supply 1302 is always on and is used to power the microcontroller 602 and the sensors 506, 110, and optionally other components. The high voltage supply 1304 is used to power the transmitters 614. The high voltage supply 1304 may be enabled or activated when the stylus device is transmitting a signal and therefore may be in the off or de-activated state when the stylus device is not transmitting to the computing device. This allows power to be conserved when the stylus device is not being used.

The components described above may be implemented to perform various functions such as enable the computing device to communicate to the stylus device using a capacitive link; change the operating frequency of the stylus device to accommodate for a changing noise environment; change the output of the stylus device so that it can communicate and function with a multitude of touch controllers; and provide a low power and low latency methodology of detecting touch down.

A method of configuring the stylus device to communicate with the computing device using the existing capacitive link is described with reference to FIG. 14, which shows the stylus transitioning between various operational states 1400. Beginning with the stylus device in sleep mode, illustrated as block 1402, when a user picks up the stylus device, the proximity sensor(s) on the stylus detect the user's touch/proximity, illustrated as 1404. Upon detecting the user's touch/proximity, the state machine of the stylus device is changed to be in a beacon mode, illustrated as block 1406. In this mode, the stylus device emits a wave, for example, a square wave at about 250 kHz (or other high frequency that is outside normal range of noise), and enables the AFE to listen for a touch controller communication. The 250 kHz beacon is detected by the computing device 104, such as through the touch controller using circuitry capable of detecting the beacon signal that is integrated into most touch controllers.

In response to detecting the wave output by the stylus device, the touch controller may be configured to transmit a handshake packet to the stylus device using the capacitive link by using drive lines/electrodes of the touch screen to change the electric field. In this mode, all the electrodes of the touch screen may be activated simultaneously (similar to "blanking" between scan frames), which can be received by the stylus device. This activation of the electrodes causes the computing device to emit a signal (electric field) different than the electric field emitted by the computing device in normal operation. By activating all (or a substantial number of) the electrodes, the SNR of the signal may be high. This allows high frequencies to be used to establish a low noise communication channel. The stylus device detects this change in the electric field or signal emitted by the computing device and recognizes this signal as a communication.

As part of the handshake, or in a different communication, using the electrodes, the touch controller may transmit configuration information to the stylus device 102 to request the stylus device 104 to operate in a certain mode. The stylus may use this configuration information to configure (1409) its operation to match the computing device 104. The configuration information may include an identifier or identification code of the computing device 104, an identifier or identification code corresponding to an encoding scheme and/or an operating frequency stored on the stylus device 102, or other information for communicating a mode of operation to the stylus device 102.

In an example, the touch controller transmits a 3 bit Manchester encoded bit pattern in response to sensing the stylus device. The 3 bit Manchester encoding may aid in error correction by enabling majority polling schemes. A preliminary part of the packet consists of a frequency synch (for example, a 15 pulse frequency sync) where the frequency of the pulses is the requested frequency of transmission from the stylus device. For example, when the computing device is requesting/instructing the stylus to operate at a frequency of 85 kHz, the computing device may activate all the electrodes on the touch panel simultaneously, fifteen times at 85 kHz, resulting in number of electronic pulses corresponding to the desired communication frequency. In another embodiment, the computing device may only activate the electrodes in proximity to the stylus device to cause the communication to occur.

The frequency synch may be followed by a 2 bit start of frame (0,0), a 3 bit identifier or identification code (also referred to herein as a configuration ID), and a 2 bit end of frame (1,1). This handshake packet may be transmitted by the touch controller about every 10 ms. In the time between transmissions, the touch controller listens for a stylus transmission that matches or acknowledges the requested operation. Once the correct stylus operation is detected, the touch controller may cease transmitting the handshake signals. The configuration ID includes a 3-bit code that represents the encoding scheme used/supported by the touch controller of the computing device to communicate with a stylus device. For example, the configuration ID (1,1,1) may indicate that the touch controller of the computing device uses frequency shift keying (FSK) scheme for communicating with stylus devices. Similarly, configuration ID (0,0,0) may represent the BPSK communication scheme and configuration ID (0,1,0) may represent the ASK communication scheme.

In response to a successful handshake, illustrated as 1408, the stylus device may configure itself to operate in the requested encoding scheme or mode (i.e., FSK, BPSK or ASK), and enter an active mode, illustrated as block 1410. For example, once the stylus device wakes up and receives two consecutive valid configuration IDs from the computing device, the stylus device loads the relevant sub routines from the memory and changes its state from the beacon mode to the active mode. However, when the handshake fails or times out (T/O), illustrated as 1412, the stylus device may re-enter the sleep mode, illustrated as block 1402.

In an embodiment, the stylus device may also configure the transmitters/electrodes in an active (i.e., transmit)mode or set to the transmitters/electrodes to ground (i.e., an inactive mode) based on the configuration ID received from the computing device. For example, one or more of the tip electrode, barrel/body electrodes, and the ferrule electrode may be deactivated to allow the stylus device to operate with certain types of touch controllers and/or operate in a similar manner to a different type of stylus device that may not use the particular deactivated electrode(s). In an embodiment, the tip, the barrel/body, and the ferrule electrode may be activated when the stylus device is configured in a BPSK encoding scheme. In an embodiment, the tip or both of the tip and the ferrule electrode may be activated and the remaining electrodes may be set to ground when the stylus device is configured in a ASK encoding scheme. In another embodiment, the tip may be activated and the remaining electrodes may be set to ground when the stylus device is configured in a FSK encoding scheme. It should be appreciated that various other configurations of the electrodes are possible.

In other configurations, the various electrodes may be selectively activated or grounded to allow the stylus device to conserve power. For example, to conserve power, only the tip may be activated and the remaining electrodes may be deactivated. It should be appreciated that each electrode may be activated or deactivate independently to provide for a multitude of combinations.

Figure 14:
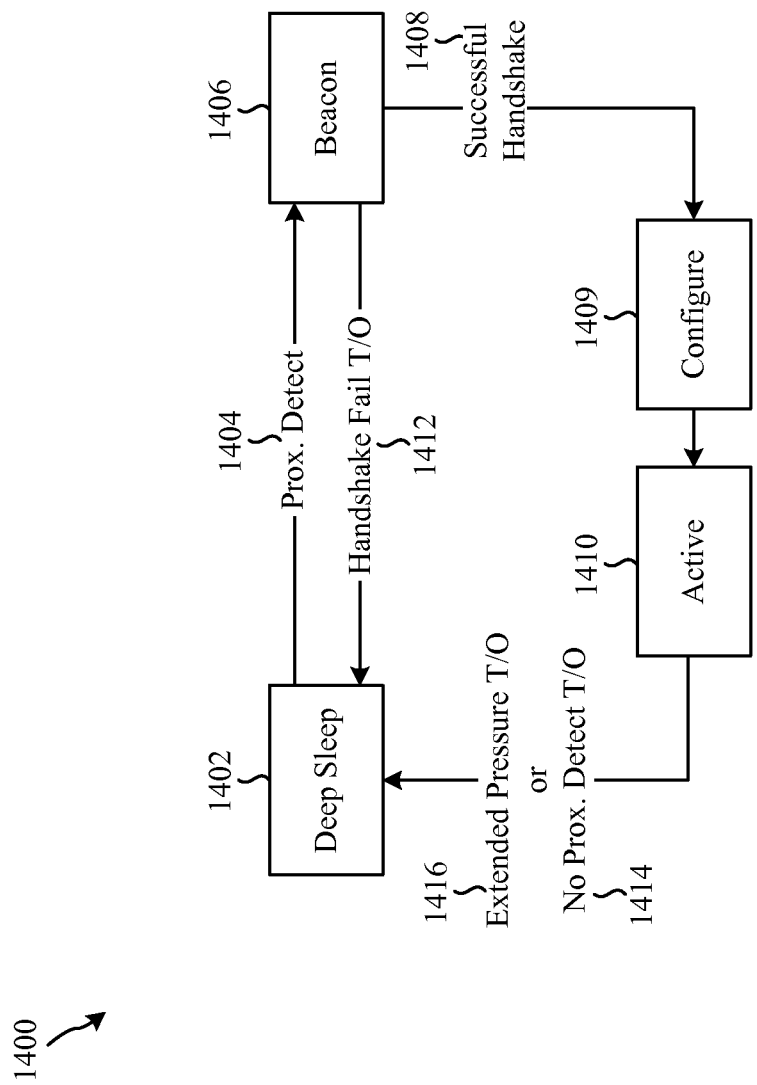
FIG. 14 illustrates an exemplary method of configuring a stylus device to communicate with a computing device according to embodiments of the present disclosure.

Referring to FIG. 14, when in active mode, the stylus device may re-enter the sleep mode, illustrated as block 1402, in response to the user discontinuing use of the stylus device. For example, in active mode, the stylus device may poll the proximity sensor(s) and/or the pressure sensor to determine whether the user is still using the stylus device. In response to the proximity sensor(s) not detecting any touch by the user and/or the pressure sensor reading a pressure of zero for a certain period of time (i.e., a pressure and/or proximity based time out), illustrated as 1414 and/or 1416, the stylus device may re-enter the sleep mode, illustrated as block 1402. Thus, if the pressure sensor and/or the proximity sensor does not register a reading or the reading is below a threshold for a certain amount of time, then the stylus device is not being used and the stylus device can enter the sleep mode. In other words, the stylus device continues to operate in the active mode until a pressure and/or proximity based time out is achieved.

During operation in the active mode, the stylus device may continuously or periodically listen for communications from the touch controller. If the computing device detects noise at a current operating frequency of the stylus device (such as a pre-selected or default frequency) that interferes with stylus-computing device communications, or if the touch controller identifies a better (i.e., higher quality) operating frequency that can be used, the touch controller may start transmitting handshake packets as described above to change the stylus device's behavior to operate at a different or second operating frequency, as describe in further detail below.

Figure 15:
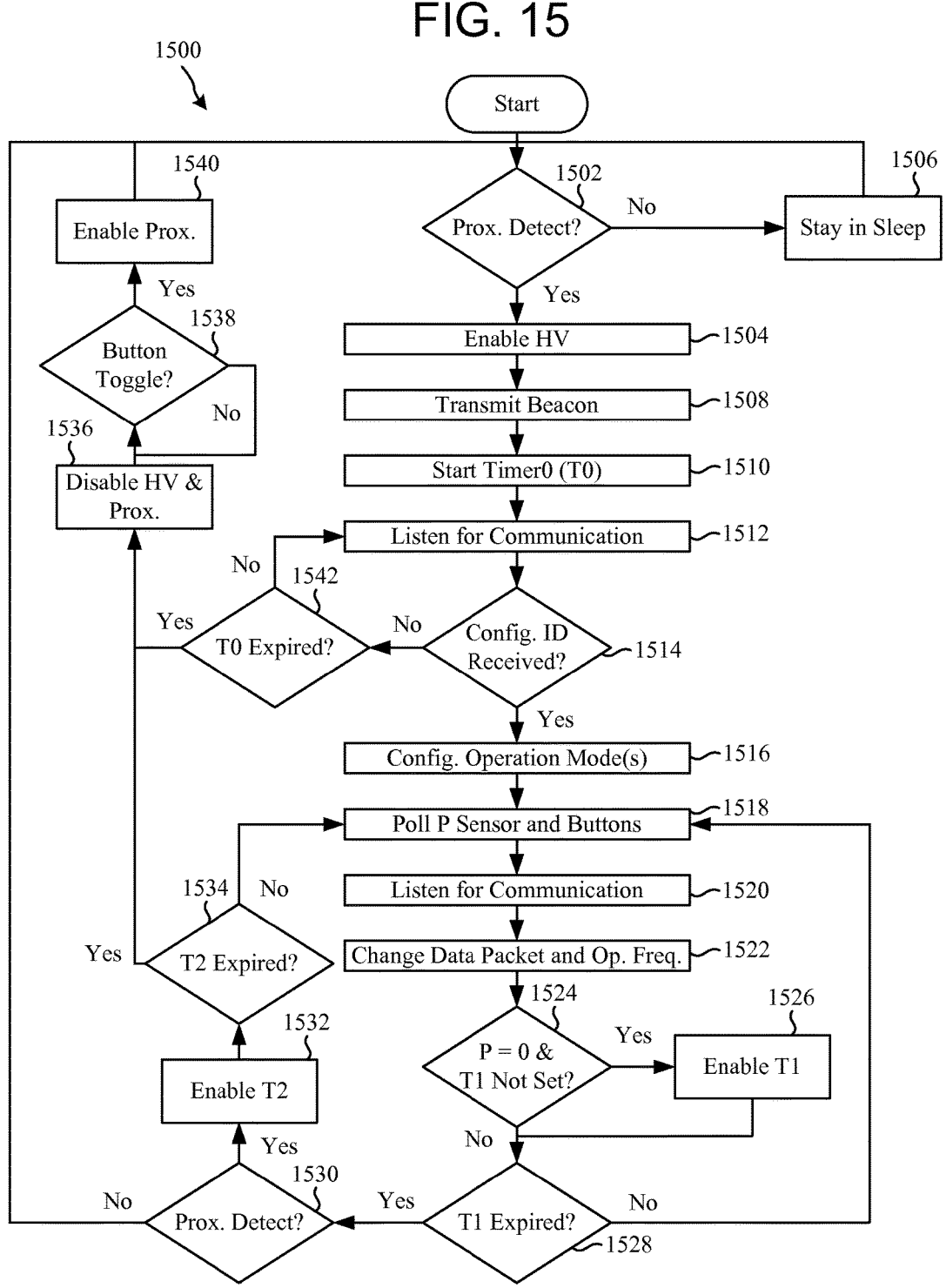
FIG. 15 illustrates an exemplary method of operation of a stylus device in an active mode according to embodiments of the present disclosure.

A method 1500 of operation of the stylus device in the active mode according to an embodiment of the disclosure is described with reference to FIG. 15. FIG. 15 illustrates a method 1500 to determine when the stylus is being used and should remain in active mode and when the stylus is not being used and should enter a sleep mode to conserve power. In this embodiment, it is assumed that the stylus device is in the sleep mode at the beginning of method 1500. At block 1502, the stylus device determines whether the stylus device is being used by a user. For example, the stylus device may make this determination based on a signal from a proximity sensor indicating a nearby user. If the proximity sensor indicates that the stylus device is being used by a user, the high voltage (HV) circuit is enabled at step 1504. If at block 1502, the proximity sensor indicates that the stylus device is not being used by the user, the stylus device remains in the sleep mode, illustrated by block 1506. In some embodiments, the stylus device may poll the proximity sensor to determine whether the proximity sensor has detected the presence of a user and if no reading from the proximity sensor is received/detected for a predefined time, the stylus device may return/remain in the sleep mode.

In response to the HV being enabled, the stylus device transmits a beacon signal or a square wave to the computing device, illustrated as block 1508. As described above, in this mode, in an embodiment, the stylus device emits a square wave, for example, at about 250 kHz (or other high frequency that is outside normal range of noise), and enables the AFE to listen for a touch controller communication. Upon entering the beacon mode, the stylus device initiates a timer0 (T0), illustrated as block 1510, and listens for a communication from the computing device, illustrated as block 1512. As described above, the computing device, using its touch controller, may transmit a 3 bit Manchester encoded bit pattern in response to sensing the stylus device. The 3 bit Manchester encoding may include a frequency synch, followed by a 2 bit start of frame, a 3 bit configuration ID, and a 2 bit end of frame.

The stylus device determines whether the configuration ID has been received, illustrated as block 1514. In response to the configuration ID being received, the stylus device configures the stylus device to operate using the encoding scheme or operation mode corresponding to the configuration ID of the computing device (e.g., FSK, BPSK or ASK), illustrated as block 1516, and shifts to active mode. Configuration information may be stored in a memory of the stylus device and retrieved based on the received configuration ID. During regular operation in the active mode, the stylus device may continue to poll the pressure (P) sensor and buttons to determine whether the stylus device is being used, illustrated as block 1518. The stylus device also continuously or periodically listens for communications from the touch controller, illustrated as block 1520, to determine whether the computing device is transmitting information that may cause the stylus device to change the stylus device's behavior/operation.

If the touch controller detects noise at a current operating frequency that the computing device and stylus device are using to communicate (for example, an operating frequency associated with the configuration ID described above), the touch controller may transmit handshake packets as described above to change the stylus device's behavior/operation. For example, the touch controller may transmit a change data packet communication including information corresponding to a new/second operating frequency having a better signal to noise ratio (SNR) to be used for communication with the computing device. This may prompt the stylus device to change its operation and operate using the second operating frequency. The stylus device receives this communication and changes the operating frequency of the stylus device (otherwise referred to a frequency hopping), illustrated as block 1522.

During operation, the stylus device may determine whether the stylus is still being held by a user, for example by polling the pressure sensor and buttons and determining whether the pressure sensor is reading zero and a timer 1 (T1) (a pressure timeout timer) is set (for example, at about 1 minute), illustrated as block 1524. If T1 is not set, the stylus device enables T1, illustrated as block 1526. When T1 is or has been sent, the stylus device determines whether T1 has expired, illustrated as block 1528. If T1 has not expired, the stylus device continues to poll the pressure sensor and buttons and the process returns to block 1518. If at block 1528 it is determined that T1 has expired (i.e., there has been no pressure reading above zero for a certain amount of time, for example, about 1 minute), the stylus device checks whether the user's touch/proximity continues to be detected by the proximity sensor(s), illustrated as block 1530. This check will indicate that even if the stylus has not been used to contact the device within a certain amount of time, the device is still being held by the user. If no user's touch/proximity is detected, the stylus device returns to sleep mode, illustrated as block 1506.

However, if the user's touch/proximity continues to be detected, the stylus device enables a timer2 (T2) (a proximity/touch timeout timer, for example, set at about 3 minutes), illustrated as block 1532, and determines whether T2 has expired, illustrated as block 1534. If T2 has not expired, the stylus device moves back to block 1518 and continues to poll the pressure sensor and buttons. However, if T2 has expired, the stylus device proceeds to disable the HV and the proximity sensor(s), illustrated as block 1536.

Optionally, the stylus device may then determine whether a button toggle has occurred, illustrated as block 1538. If no button toggle has occurred, the stylus device continues to poll the buttons to determine whether a button toggle has occurred. If a button toggle has occurred, the stylus device enables the proximity sensor(s), illustrated as block 1540, and determines whether the proximity sensor(s) detect the user's touch/proximity, illustrated as block 1502. If the user's touch/proximity is not detected, the stylus device enters the sleep mode, illustrated as block 1506.

Referring back to block 1514, in response to the configuration ID failing to be received, the stylus device determines whether T0 (a listening timeout timer, for example, set at about 30-45 seconds) has expired, illustrated as block 1542. In response to T0 not being expired, the stylus device continues to listen for a communication from the touch controller, illustrated as block 1512. However, in response to T0 being expired, the stylus device proceeds to block 1536 to disable the HV and the proximity sensor(s), and follows the path of blocks 1538-1540 as described above.

In an embodiment, the stylus device 102 may be configured with firmware (or other code) containing a number of various modes of operation/encoding/frequency schemes that correspond to different computing devices. The stylus device 102 may be pre-loaded with such firmware or may be updated to include such firmware. The modes of operation/encoding schemes may be identified by an identifier or identification code, such as a device identifier or configuration ID, which may relate to a specific computing device. In this embodiment, the stylus device 102 may be configured to operate with specific computing devices 104 using the device identifiers. For example, the computing device 104 or touch controller of the computing device 104 may transmit a device identifier to the stylus device 102 and the stylus device 102 may access or pull the corresponding firmware from memory and configure itself in the mode of operation/encoding scheme corresponding to the received device identifier. The stylus may then be configured to operate with the corresponding computing device.

In an embodiment, the stylus device 102 may not be pre-loaded with firmware corresponding to a specific identifier or identification code. In this situation, the stylus device 102 may request the computing device 104 to send the corresponding firmware to the stylus device 102. The computing device 104 may send this firmware to the stylus device 102 using the capacitive channel or other communication channel, such as Bluetooth, IR, etc.

In an embodiment, the identifier or identification code may relate to a frequency of operation (which may be a single frequency or a group of frequencies). The identifier or identification code may be a code to a look-up table where the frequency of operation is located. In this embodiment, the stylus device 102 may be configured with firmware (or other code) containing a number of various frequencies or groups of frequencies. The stylus device 102 may then use the look-up table to find and select the operating frequency that corresponds to an identifier or identification code received from the computing device 104.

Figure 16:
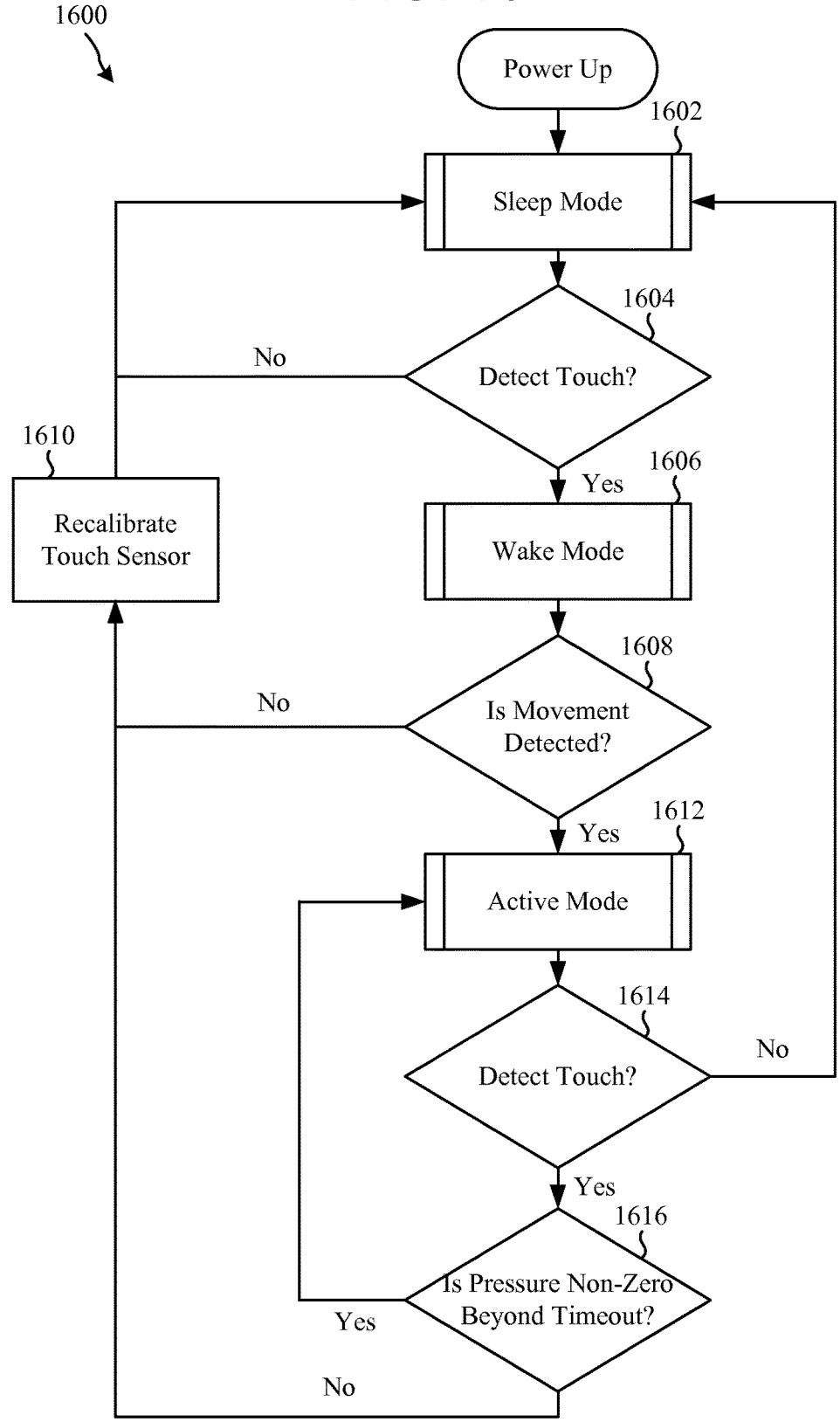
FIG. 16 illustrates an exemplary method altering a mode of a stylus device according to embodiments of the present disclosure.

In another embodiment, once the appropriate configuration sub-routine(s) have been loaded, the stylus device may remain in that configuration. Thus, once the stylus is in the correct configuration to interact with the computing device, the stylus device may transition to and from active and sleep mode without requiring the subroutine(s) to be loaded. A method 1600 of utilization of the proximity sensor(s), accelerometer, and pressure sensors to alter the mode of the stylus between an active mode and a sleep mode is described with reference to FIG. 16. Beginning with the stylus device in sleep mode, illustrated as block 1602, the proximity sensor(s) on the stylus device detect whether a user is touching the stylus device, illustrated as block 1604. If the proximity sensor(s) detect no touch from the user, the stylus device remains in sleep mode, illustrated as block 1602.

However, when the proximity sensor(s) detect the user's touch, the stylus device shifts to a wake detect mode, illustrated as block 1606. In this mode, the stylus device activates the accelerometer and polls the accelerometer to determine whether there is any movement detected, illustrated as block 1608. If the accelerometer does not detect any movement, the touch sensor may be recalibrated (i.e., set to zero), illustrated as block 1610, to avoid further false touches and the stylus device returns to the sleep mode, illustrated as block 1602. However, if the accelerometer detects movement, the stylus device enters an active mode, illustrated as block 1612.

In the active mode, the stylus device polls the proximity sensor(s) to determine whether the proximity sensor(s) detect the user's touch, illustrated as block 1614. If the proximity sensor(s) does not detect the user's touch beyond a timeout event, the stylus device returns to the sleep mode, illustrated as block 1602. If the proximity sensor(s) detects the user's touch, the stylus device polls the pressure sensor to determine whether the pressure sensor detects a non-zero pressure for a certain period of time (i.e., beyond a timeout event), illustrated as block 1616. If the pressure is non-zero, the stylus device remains in the active mode, illustrated as block 1612. However, if the pressure is bot non-zero, the touch sensor may be recalibrated, illustrated as block 1610, to avoid further false touches and the stylus device returns to the sleep mode, illustrated as block 1602.

In an embodiment, the stylus device in the active mode functions in one of two operational modes 1) hover or 2) touch down. In this embodiment, the pressure sensor output is used to determine the operational mode of the stylus. When there is no pressure detected but the stylus device is capable of communicating with the computing device, the stylus may be determined to be hovering within a certain distance of the screen. A detection of a non-zero pressure reading from the stylus' pressure sensor may indicate that the tip of the stylus device is likely in physical contact with the touch screen (i.e., a touch town event has likely occurred). Thus the stylus may be determined to be in touch down mode.

Figure 17:
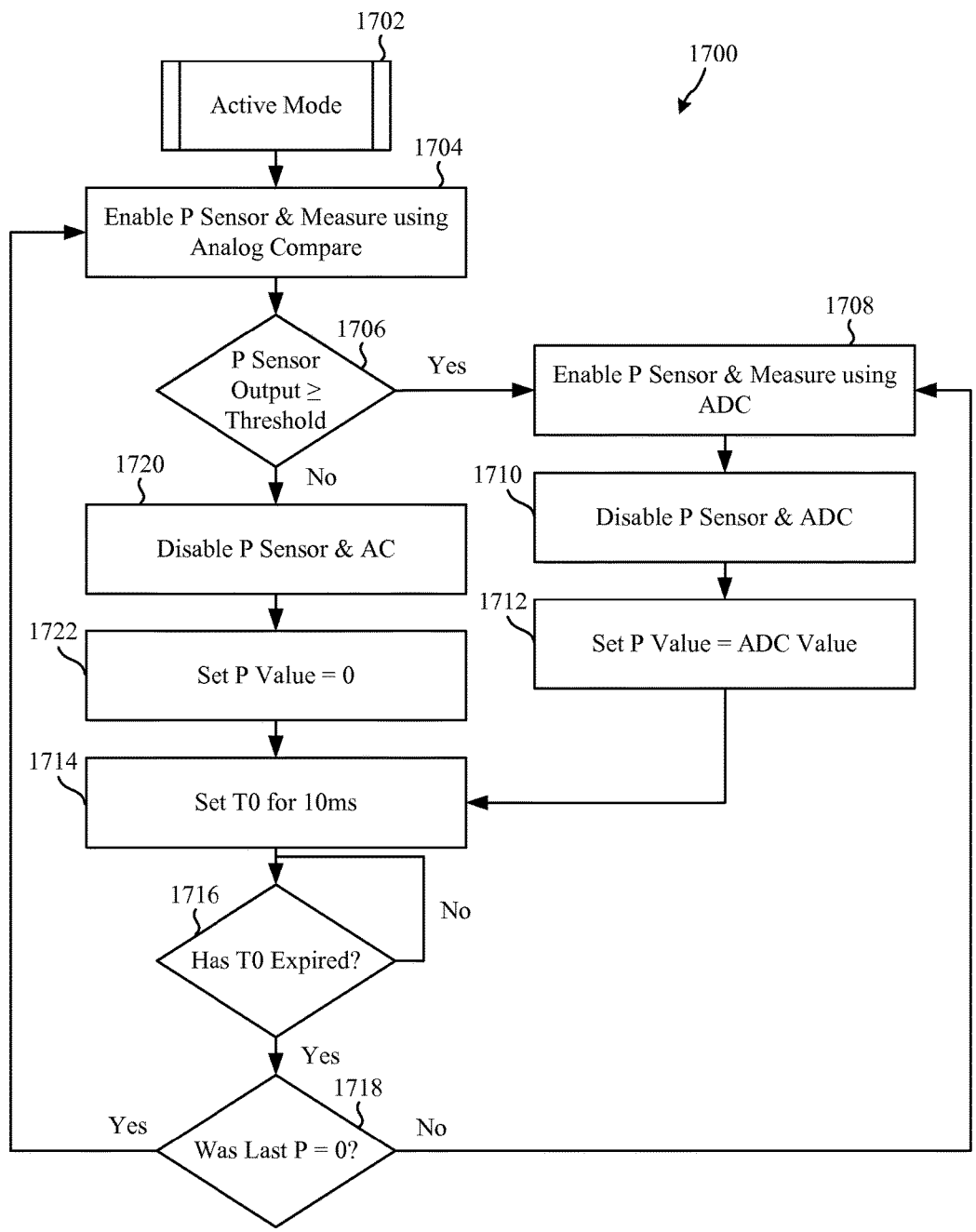
FIG. 17 illustrates an exemplary method of a low power and low latency methodology of detecting touch down of a stylus device according to embodiments of the present disclosure.

In an embodiment, the pressure sensor and power supply are utilized to provide a low power and low latency methodology of detecting touch down when the stylus device is in hover mode. A low power and low latency methodology 1700 of detecting touch down is described with reference to FIG. 17. In the active mode, such as when the stylus device is hovering, illustrated as block 1702, the stylus device enables the pressure sensor and monitors and measures the output of the pressure sensor using a low power analog comparator, illustrated as block 1704. The stylus device utilizes the analog comparator to determine when output from the pressure sensor meets or exceeds a threshold (i.e., indicating a touch down event has likely occurred), illustrated as block 1706.

When the analog comparator detects the output of the pressure sensor crossing the threshold, the stylus device enables the pressure sensor and activates (i.e., powering) and measures the output of the pressure sensor using an ADC, illustrated as block 1708, to obtain a more accurate measure of the output of the pressure sensor. When powering the ADC, the device provides power to the ADC, enabling operation of the ADC. When the ADC draws power, it consumes battery life, but enables more accurate measurement of the output of the pressure sensor. When the ADC is deactivate or powered down, power is not provided to the ADC, thus conserving battery life. Upon activating the ADC, the stylus device may also deactivate (i.e., power down) the analog comparator. Once the output of the pressure sensor is measured using the ADC (for example an ADC illustrated in FIG. 12A or FIG. 12B), the stylus device disables the pressure sensor and the ADC (for example, powering down the ADC), illustrated as block 1710, and sets the pressure value equal to the ADC value, illustrated as block 1712, thus noting the value of the measured pressure (as indicated by the ADC value) for that particular operation of the stylus. The value of the measured pressure may be transmitted to the computing device for various functions, for example for determining the width of a pen stroke when the computing device is configured to draw the width corresponding to the pressure between the stylus tip and the computing device.

The stylus device then sets timer0 (T0) (for example, at about 10 ms), illustrated as block 1714, and determines whether T0 has expired, illustrated as block 1716. If T0 has not expired, the process continues to monitor the timer. If T0 has expired, the stylus device determines whether the last pressure output (i.e. the pressure output from block 1712 described above or block 1722 described below) was equal to zero, illustrated as block 1718. If the last pressure output was greater than zero, the process returns to block 1708 and continues as described. However if the last pressure output was zero, the stylus device reverts back to block 1704, enables the pressure sensor and monitors and measures the output of the pressure sensor using the analog comparator, and de-activates the ADC.

When the analog comparator detects the output of the pressure sensor has not crossed the threshold, the stylus device disables the pressure sensor and the analog comparator, illustrated as block 1720, and sets the pressure value equal to zero, illustrated as block 1722. The stylus device then sets T0, illustrated as block 1714, and continues as described above.

Figure 18:
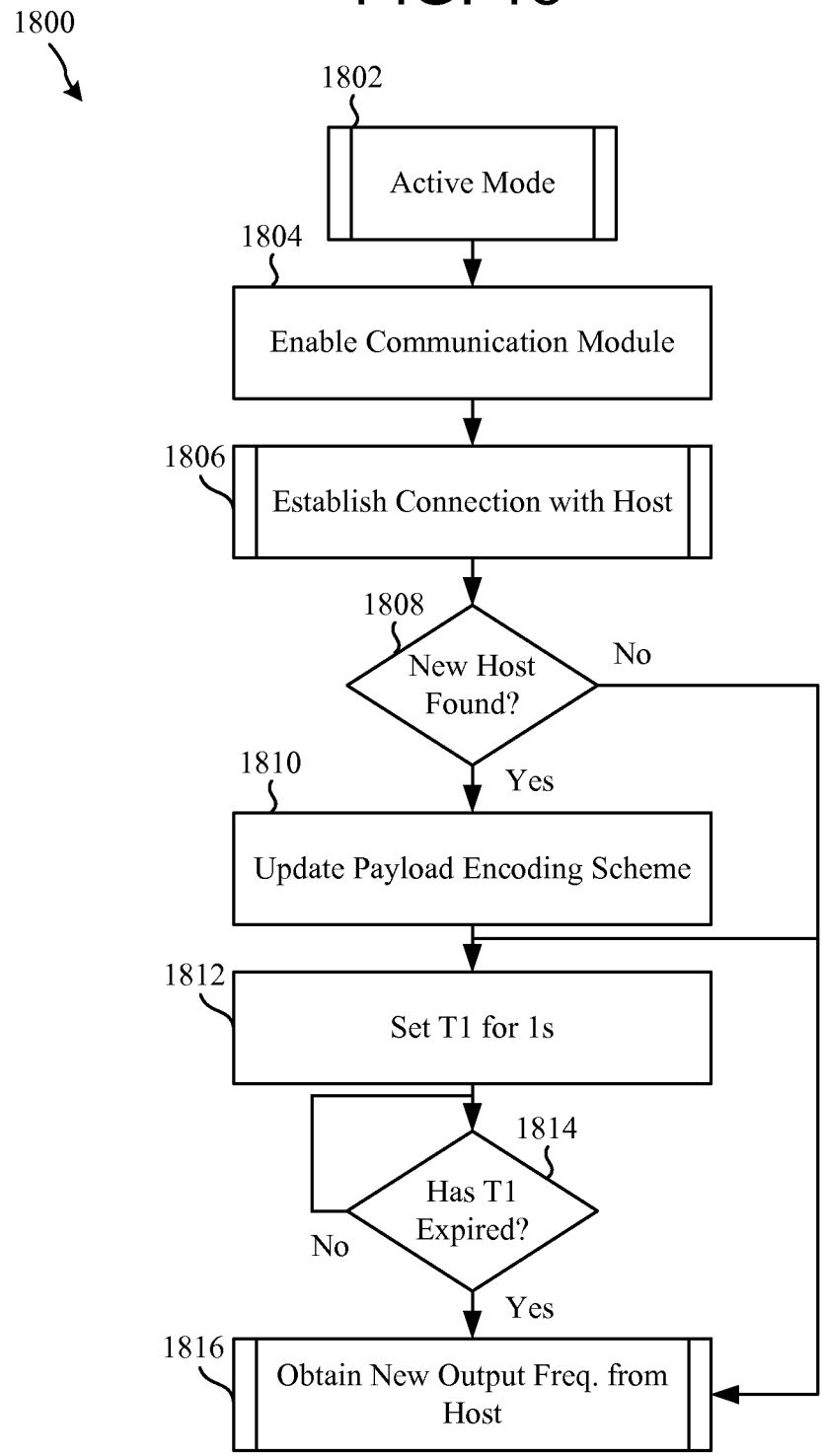
FIG. 18 illustrates an exemplary method of changing an output of a stylus device according to embodiments of the present disclosure.

In another embodiment, the stylus device may communicate with more than one computing device and configure the stylus operation so that it can communicate and function with different touch controllers of the different computing devices. A method 1800 of configuring the stylus to the device is described with reference to FIG. 18. The method 1800 is an alternative method of configuring and reconfiguring the stylus to work with a particular computing device than those discussed above. In particular, method 1800 describes the use of a timer T1, that is a timer used to establish a time for matching a frequency between the stylus and device. When the stylus device 102 is in an active mode, illustrated as block 1802, the stylus device may enable a communication module, such as Bluetooth, WiFi, infrared (IR), haptic, etc., illustrated as block 1804, and establish a connection with the host computing device 104, illustrated as block 1806. The stylus device then determines whether the host computing device is a new host computing device, illustrated as block 1808.

If the host computing device is a new host computing device, the stylus device may receive a communication or message including data from the host computing device identifying the encoding scheme (i.e., FSK, BPSK or ASK), and update the encoding scheme of the stylus device, illustrated as block 1810, based on the communication from the host computing device. The stylus device may then set timer 1 (T1) (for example, to 1 second), illustrated as block 1812, and determine whether T1 has expired, illustrated as block 1814. If T1 has not expired, the stylus device may continue to poll T1. If T1 has expired, the stylus device may obtain a new output operating frequency from the host computing device, illustrated as block 1816. This may occur when the touch controller of the host computing device detects noise at a current or first operating frequency (which may be a first group of frequencies), and the touch controller may transmit data to change the stylus device's behavior to use a second operating frequency (which may be a second group of frequencies).

If the host computing device is an existing host device (i.e., not a new host device), the stylus device may set timer 1 (T1), illustrated as block 1812, and continue the process as described above, and/or obtain a new output operating frequency from the host computing device, illustrated as block 1816, if the touch controller decides to change the operating frequency of the stylus device. The touch controller may decide to change the operating frequency of the stylus device due to noise being present on the current operating frequency or simply because there is another frequency that is better or than the current operating frequency.

Figure 19:
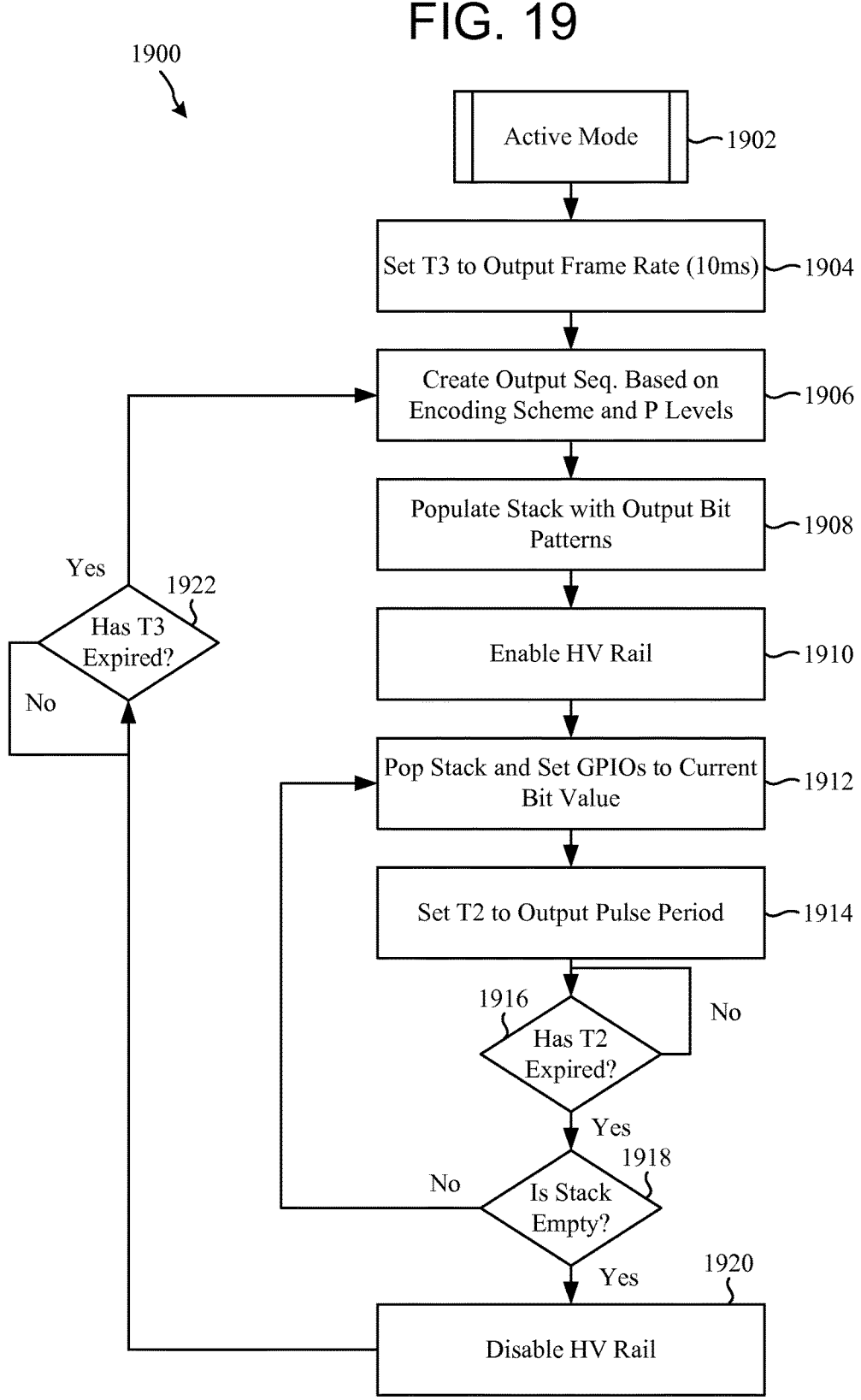
FIG. 19 illustrates an exemplary power saving method of operating a stylus device according to embodiments of the present disclosure.

In an embodiment, a power saving method 1900 of operating the stylus device is described with reference to FIG. 19. When the stylus device is in active mode, illustrated as block 1902, the stylus device may set a timer3 (T3) to an output frame rate (for example, at about 10 ms for a burst mode and 0 ms for a continuous mode), illustrated as block 1904. T3 may be a timer corresponding to a time at which each transmission (via one or more of the electrodes of the stylus device) from the stylus device to the computing device occurs. The stylus device may create an output sequence to be transmitted to the computing device based on the encoding scheme (i.e., FSK, BPSK or ASK), output pressure levels of the pressure sensor, buttons, and other components of the stylus device, illustrated as block 1906. The output sequence may be the data the stylus device is to transmit to the computing device encoded with the appropriate encoding scheme (i.e. the output bit patterns the stylus device is to transmit to the computing device). The stylus device populates a memory stack with output bit patterns, illustrated as block 1908. The HV rail is then enabled, illustrated as block 1910, and the stack is popped and the output GPIO(s) is set to the current bit value (i.e. the first bit is written to the output GPIO(s)), illustrated as block 1912. When the stack is popped the next bit pattern shifts to the top of the stack and is ready to be written to the output GPIO(s). The stylus device then sets a timer2 (T2) to an output frequency pulse period (i.e., the stylus may be transmitting 300 kHz), illustrated as block 1914, and determines whether T2 has expired, illustrated as block 1916.

If T2 has not expired, the stylus device continues to poll T2. Until T2 has expired, the output GPIO is held at the current bit value. However, if T2 has expired, the stylus device determines whether the stack is empty, illustrated as block 1918. If the stack is not empty, the stylus device proceeds back to block 1912 to pop the stack (for example, to reveal the next bit pattern) and set the output GPIO(s) to the next bit value, and proceeds as described until all the bits in the stack have been written to the output GPIO(s). For example, the first bit is set on the output GPIO(s), and when T2 has expired the second bit is set on the GPIO(s), and when T2 has expired the third bit is set on the GPIO(s), etc.

If the stack is empty, the stylus device disables the HV rail, illustrated as block 1920, and determines whether T3 has expired, illustrated as block 1922. If T3 has not expired, the stylus device continues to poll T3. However, if T3 has expired, the stylus device proceeds to block 1906 to create an output sequence based on the encoding scheme and output pressure levels, and proceeds as described above. It should be appreciated that the different timers discussed above may be set based on the encoding scheme or operation mode the stylus device is operating.

Figure 20:
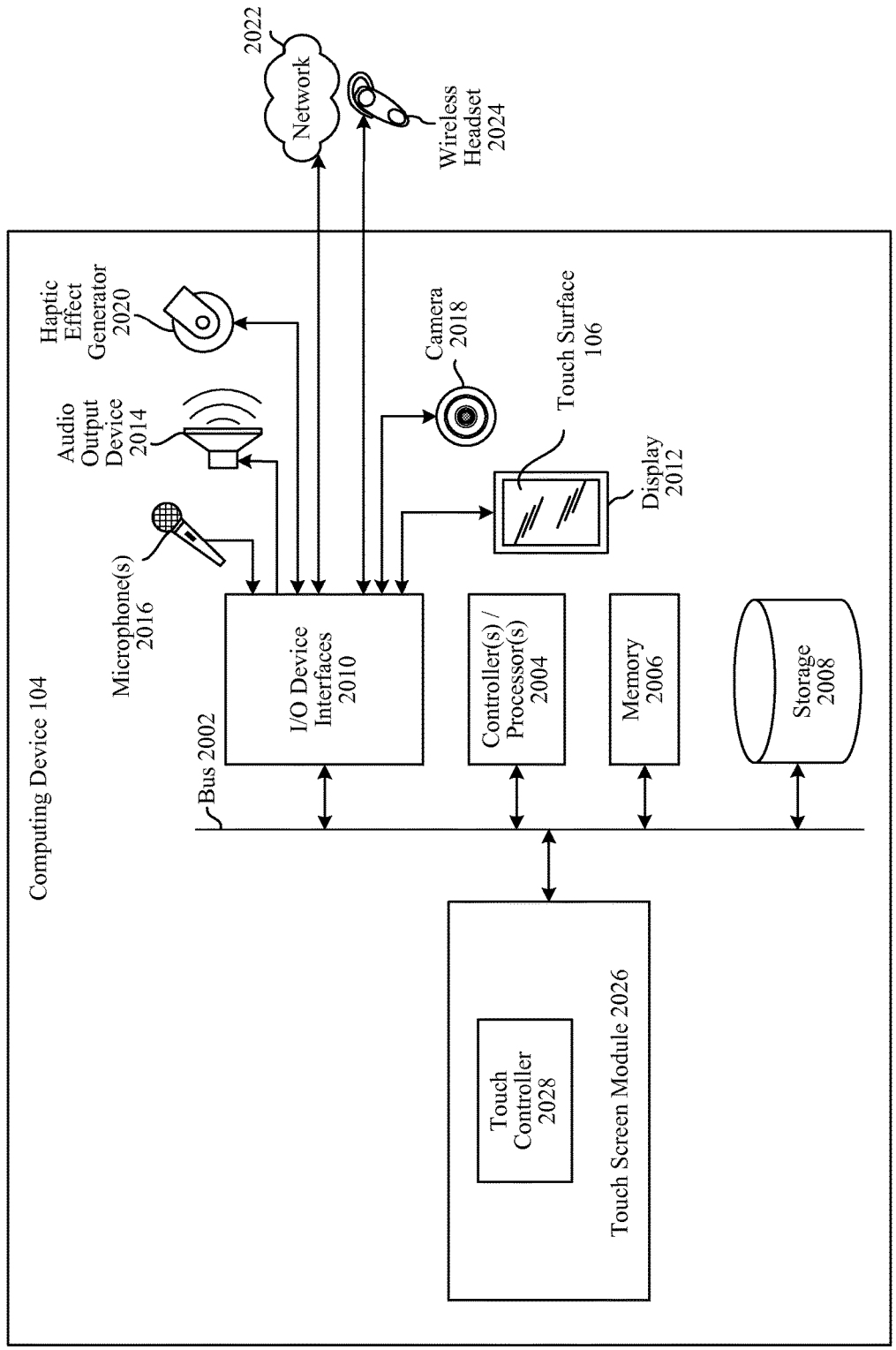
FIG. 20 is a block diagram conceptually illustrating example components of a computing device according to embodiments of the present disclosure.

FIG. 20 is a block diagram conceptually illustrating example components of the computing device 104. In operation, the computing device 104 may include computer-readable and computer-executable instructions that reside on the computing device 104, as will be discussed further below.

As illustrated in FIG. 20, the computing device 104 may include an address/data bus 2002 for conveying data among components of the computing device 104. Each component within the computing device 104 may also be directly connected to other components in addition to (or instead of) being connected to other components across the bus 2002.

The computing device 104 may include one or more microcontrollers/controllers/processors 2004 that may each include a central processing unit (CPU) for processing data and computer-readable instructions, and a memory 2006 for storing data and instructions. The memory 2006 may include volatile random access memory (RAM), non-volatile read only memory (ROM), non-volatile magnetoresistive (MRAM) and/or other types of memory. The computing device 104 may also include a data storage component 2008, for storing data and microcontrollers/controller/processor-executable instructions (e.g., instructions to perform one or more steps of the methods illustrated in FIGS. 14-19). The data storage component 2008 may include one or more non-volatile storage types such as magnetic storage, optical storage, solid-state storage, etc. The computing device 104 may also be connected to removable or external non-volatile memory and/or storage (such as a removable memory card, memory key drive, networked storage, etc.) through the input/output device interfaces 2010.

Computer instructions for operating the device 110 and its various components may be executed by the microcontroller(s)/controller(s)/processor(s) 2004, using the memory 2006 as temporary "working" storage at runtime. The computer instructions may be stored in a non-transitory manner in non-volatile memory 2006, storage 2008, or an external device. Alternatively, some or all of the executable instructions may be embedded in hardware or firmware in addition to or instead of software.

The computing device 104 includes input/output device interfaces 2010. A variety of components may be connected through the input/output device interfaces 2010, such as a display 2012 having a touch surface or touch screen 106; an audio output device for producing sound, such as speaker(s) 2014; one or more audio capture device(s), such as a microphone or an array of microphones 2016; one or more image and/or video capture devices, such as camera(s) 2018; one or more haptic effect generators 2020; and other components. The display 2012, speaker(s) 2014, microphone(s) 2016, camera(s) 2018, haptic effect generator(s) 2020, and other components may be integrated into the computing device 104 or may be separate.

The display 2012 may be a video output device for displaying images. The display 2012 may be a display of any suitable technology, such as a liquid crystal display, an organic light emitting diode display, electronic paper, an electrochromic display, a cathode ray tube display, a pico projector or other suitable component(s). The display 2012 may also be integrated into the computing device 104 or may be separate.

The input/output device interfaces 2010 may also include an interface for an external peripheral device connection such as universal serial bus (USB), FireWire, Thunderbolt or other connection protocol. The input/output device interfaces 2010 may also include a connection to one or more networks 2022 via an Ethernet port, a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. A headset 2024 may connect to the computing device 104 via one of these connections.

The computing device 104 further includes a touch surface or touch screen module 2026 that interacts with the stylus 102. The touch screen module 2026 may include a touch controller 2028 that may be located near the touch surface 106. The touch controller 2028 receives location and other information from, and may cause the transmission of information to, the stylus 102 to enable the computing device 104 to interact with the stylus 102. In an embodiment, the touch controller 2028 activates or drives one or more antennae of the touchscreen to generate a signal, such as an electric field, that the stylus device 102 interacts with. In an embodiment, the touch controller 2028 may scan, like a radio, for certain frequencies. When the touch controller 2028 senses a stylus device, the touch controller 2028 may enter a stylus mode. Upon entering the stylus mode, the touch controller 2028 may convert the sensors of the computing device 104 to antenna mode, and listen for the stylus device 102 to determine or receive location of the stylus device 102 and other information from the stylus device.

It should be appreciated that one or more of the functional components illustrated in and described with reference to FIGS. 3-13 and 20 may perform one or more of the steps of the methods illustrated in and described with reference to FIGS. 14-19.

The above embodiments of the present disclosure are meant to be illustrative. They were chosen to explain the principles and application of the disclosure and are not intended to be exhaustive or to limit the disclosure. Many modifications and variations of the disclosed embodiments may be apparent to those of skill in the art. Persons having ordinary skill in the field of computers, digital imaging and/or content conversion, should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

The concepts disclosed herein may be applied within a number of different devices and computer systems, including, for example, general-purpose computing systems, televisions, stereos, radios, server-client computing systems, mainframe computing systems, telephone computing systems, laptop computers, cellular phones, personal digital assistants (PDAs), tablet computers, wearable computing devices (watches, glasses, etc.), other mobile devices, etc.

Embodiments of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media.

As used in this disclosure, the term "a" or "one" may include one or more items unless specifically stated otherwise. Further, the phrase "based on" is intended to mean "based at least in part on" unless specifically stated otherwise.

What is claimed is:

1. A stylus device, comprising:
a body portion having a first end and a second end;
a processor disposed in the body portion and adapted to process a message including data received from a computing device;
a ferrule portion coupled to the first end of the body portion;
a tip coupled to the ferrule portion on an end of the ferrule portion opposite the body portion, wherein the tip portion is adapted to contact a surface of the computing device;
a receive electrode disposed in the ferrule portion and adapted to detect an electric field generated by electrodes of the surface of the computing device; and
an analog front end component in communication with the receive electrode, the analog front end component adapted to:
receive the message from the computing device, wherein the message is carried by the electric field;
determine a voltage corresponding to the electric field is greater than or equal to a reference voltage; and
send the message to the processor in response to the voltage corresponding to the electric field being greater than or equal to the reference voltage.

2. The stylus device of claim 1, wherein:
the message including data received from the computing device includes information corresponding to a data encoding scheme to be used for sending data to the computing device;
the information corresponding to the data encoding scheme is used in configuring the stylus device to operate with the computing device; and
the processor configures the stylus device to communicate with the computing device using the data encoding scheme.

3. A stylus device, comprising:
a body portion having a first end and a second end;
a processor disposed in the body portion;
a receive electrode disposed at the first end and adapted to receive a message including data from a computing device via an electric field generated by the computing device;
an analog front end component in communication with the receive electrode and the processor, the analog front end component adapted to:
compare a voltage corresponding to the electric field to a reference voltage; and
send the message to the processor in response to the voltage being greater than the reference voltage.

4. The stylus device of claim 3, wherein the first end includes a ferrule portion and the receive electrode is disposed in the ferrule portion.

5. The stylus device of claim 3, wherein the analog front end component is adapted to receive the message including data from the computing device via the receive electrode.

6. The stylus device of claim 5, wherein the analog front end component is adapted to monitor for the message including data from the computing device in response to the stylus device being in an active mode.

7. The stylus device of claim 5, wherein the message includes an identifier corresponding to a data encoding scheme to be used for sending data to the computing device and the processor is adapted to configure the stylus device to operate in the data encoding scheme.

8. The stylus device of claim 3, wherein the message including data from the computing device comprises a 3 bit Manchester encoded bit pattern.

9. The stylus device of claim 3, wherein the message including data includes an identifier corresponding to a data encoding scheme to be used for sending data to the computing device; and
the stylus device uses the identifier to enable the data encoding scheme.

10. The stylus device of claim 3, wherein the analog front end component includes an amplifier in communication with the processor; and
wherein the analog front end component is adapted to send the message to the processor via the amplifier in response to the voltage being less than the reference voltage.

11. A method for communicating with a computing device, comprising:
detecting, by a receive electrode of a stylus device, an electric field generated by the computing device;
receiving, by the stylus device, a message including data from the computing device via the electric field;
comparing, by an analog front end component of the stylus device, a voltage corresponding to the electric field to a reference voltage; and
sending, by the analog front end component, the message to a processor of the stylus device in response to the voltage being greater than the reference voltage.

12. The method of claim 11, wherein the message including data from the computing device is a 3 bit Manchester encoded bit pattern.

13. The method of claim 11, wherein the message including data includes an identifier corresponding to a data encoding scheme to be used for sending data to the computing device.

14. The method of claim 13, further comprising configuring the stylus device to operate in the data encoding scheme.

15. The method of claim 13, wherein the message is received by the analog front end component of the stylus device.

16. The method of claim 15, further comprising monitoring, by the analog front end component, for the message from the computing device in response to the stylus device being in an active mode.

17. The method of claim 13, further comprising determining a stored encoding scheme stored in a memory of the stylus device corresponding to the identifier.

18. The method of claim 17, further comprising enabling the stylus device to communicate using the stored encoding scheme.

19. The method of claim 18, further comprising sending data to the computing device using the stored encoding scheme.

20. The method of claim 11, wherein the message is received on a carrier frequency via the electric field.

21. The method of claim 20, wherein the carrier frequency is in a range of about 200-500 kilohertz.

* * * * *